(12) United States Patent
Adegan

(10) Patent No.: US 10,360,601 B1
(45) Date of Patent: Jul. 23, 2019

(54) METHOD FOR GENERATING A REPAIR ESTIMATE THROUGH PREDICTIVE ANALYTICS

(71) Applicant: Alexander Omeed Adegan, Irvine, CA (US)

(72) Inventor: Alexander Omeed Adegan, Irvine, CA (US)

( * ) Notice: Subject to any disclaimer, the term of this patent is extended or adjusted under 35 U.S.C. 154(b) by 681 days.

(21) Appl. No.: 14/967,068

(22) Filed: Dec. 11, 2015

Related U.S. Application Data

(60) Provisional application No. 62/090,565, filed on Dec. 11, 2014.

(51) Int. Cl.
  *G06Q 30/00* (2012.01)
  *G06Q 30/02* (2012.01)
  *G06Q 30/06* (2012.01)
  *G06Q 10/00* (2012.01)

(52) U.S. Cl.
  CPC ......... *G06Q 30/0283* (2013.01); *G06Q 10/20* (2013.01); *G06Q 30/0611* (2013.01)

(58) Field of Classification Search
  None
  See application file for complete search history.

(56) References Cited

U.S. PATENT DOCUMENTS

| | | | | |
|---|---|---|---|---|
| 6,775,647 B1 * | 8/2004 | Evans | ................... | G06Q 30/06 700/97 |
| 2002/0007289 A1 * | 1/2002 | Malin | ................... | G06Q 10/06 705/4 |
| 2004/0148188 A1 * | 7/2004 | Uegaki | ................... | G06Q 10/06 705/305 |
| 2005/0131845 A1 * | 6/2005 | Boulouednine | .... | G06Q 30/0283 705/412 |
| 2014/0331277 A1 * | 11/2014 | Frascadore | ............. | H04L 63/20 726/1 |
| 2015/0012169 A1 * | 1/2015 | Coard | ................... | G06Q 20/202 701/29.1 |

(Continued)

OTHER PUBLICATIONS

Vintr, Z., Preventive Maintenance Optimization on the Basis of Operating Data Analysis, Jan. 1, 2003, Annual Reliability and Maintainability Symposium, pp. 400-405 (Year: 2003).*

*Primary Examiner* — Michael Misiaszek
*Assistant Examiner* — Timothy J Kang
(74) *Attorney, Agent, or Firm* — White-Welker & Welker, LLC; Matthew T. Welker, Esq.

(57) ABSTRACT

Method for producing a list of parts and labor records to determine the total cost to repair and/or replace damaged parts of a vehicle involved in a collision that can evaluate millions of estimates previously written for vehicles similar to the one being assessed to produce a reliable repair estimate based on evaluation of all previous estimate data of vehicles that have incurred damage on the same points-of-impact, with similar extent-of-damage, presented as a number between 0 and 10, 10 representing the maximum amount of damage. A user inputs or selects a series of values and the method also receives input from various other sources to query a database containing millions of previously written estimates for vehicles, or structured repair data specifically produced for this propose. A cost estimate for repairing the damage and presents it as the output of the method based on the input and predictive models applied.

20 Claims, 24 Drawing Sheets

(56) References Cited

U.S. PATENT DOCUMENTS

| | | | |
|---|---|---|---|
| 2015/0039397 A1* | 2/2015 | Fuchs | G07C 5/008 705/7.35 |
| 2015/0073864 A1* | 3/2015 | Labrie | G06F 17/5004 705/7.29 |
| 2015/0294419 A1* | 10/2015 | Gonzalez Miranda | G06Q 40/08 701/31.6 |
| 2015/0317739 A1* | 11/2015 | Lawlor | G06Q 30/0283 705/4 |

* cited by examiner

| UESTIMATE | Vehicle<br>2010 toyoto prius | VIN | point of impact<br>Rear | | sample size<br>302 ESTIMATES | | search | | Go to bundle | |
|---|---|---|---|---|---|---|---|---|---|---|
| Severity: 2 | | | | PICTURE | AM VAULT | RECYCLED VAULT | ADD PART | | TOTAL $2200.54 | |
| Damaged DISC? | | SKU | Qty | Parts 5 Repair | Body | Refinish | Structural frame | Mechanical | Labour | |
| | | | Adjustments | | | | | | $0.00 | |
| | | | TOTALS | $150000 | | | | | $2200.54 | |

Pop-up (2300):

| | Hours | Rate | apply | specifies | Labor Costs | Part Costs | Total | |
|---|---|---|---|---|---|---|---|---|
| Current Estimate | | | | | $2,804 | $5445.13 | $8249.13 | |
| Guideline | | | | | | | | |
| Avaliable after market parts | | | | | | -$51.40 | | |
| Avaliable recycled parts | | | | | | -$51.40 | | |
| Avaliable discounted OEM parts | | | | | | +$51.40 | | |
| Parts Need to be delivered with in | | | | | | | | |
| Body Labor | 30.1 | $56.00 | | | +$51.40 | | | |
| Refinish Labor | 30.1 | $56.00 | | | +$126.40 | | | |
| structural Labor | 30.1 | $56.00 | | | | | | |
| Frame Labor | 30.1 | $56.00 | | | +$126.40 | | | |
| Mechanical Labor | 30.1 | $56.00 | | | | | | |
| Resulting Estimate with selected guidelines | | | | | $2467.30 | $2467.30 | $2467.30 | |

Review the impact of various guidelines by selecting their corresponding checkboxes and providing specifics, then click apply to update the estimate    Apply 2305, 2310, 2315, 2300

5polar assy    5215947905    1    $5933    ⓧ No

LT TURN SIGNAL LAMP    5215947905    1    $5933    ⓧ No    $1200

FIG. 23

METHOD FOR GENERATING A REPAIR ESTIMATE THROUGH PREDICTIVE ANALYTICS

CROSS REFERENCE TO RELATED APPLICATIONS

This application claims priority from U.S. Patent Application Ser. 62/090,565, entitled "A system and method for generating a repair estimate through statistical analysis and predictive analytics", filed on 11 Dec. 2014. The benefit under 35 USC § 119e of the United States provisional application is hereby claimed, and the aforementioned application is hereby incorporated herein by reference.

SEQUENCE LISTING OR PROGRAM

Not Applicable

FEDERALLY SPONSORED RESEARCH

Not Applicable

TECHNICAL FIELD OF THE INVENTION

The present invention relates to techniques for the automatic generation of repair estimates. More specifically, the present invention is a method for the automatic generation of repair estimates based on a plurality of data-points via predictive analytics of databases of prior repair estimates and images or simulated structured estimate data, in conjunction with utilization of an embedded parts-procurement system in order to identify, source, price and procure all the necessary parts.

BACKGROUND OF THE INVENTION

Today's collision repair estimators utilize various estimating software applications to create detailed estimates of the total cost of the labor, parts and refinish necessary to repair a given vehicle. Use of these applications requires an in-depth knowledge of the structural detail, repair procedures and techniques specific to the year, make, model and other pertinent characteristics of the vehicle being repaired. Users of these applications must select or enter the specific types of parts needed in the application while understanding the repair procedures for each specific vehicle and type of damage. This complexity is compounded by the fact that vehicle manufacturers regularly change the component makeup and design of their vehicles, therefore requiring these estimators to possess up-to-date knowledge of each vehicle and the necessary procedures to repair them.

These existing estimating software applications require special skills, are tedious, error-prone and leave the accuracy of estimates at the discretion of the person who is assessing the damage and creating the estimate. The person creating an estimate has to use her discretion to evaluate each section of the vehicle, identify the parts that are damaged, decide whether the damaged parts should be replaced or repaired, and what additional operations need to be performed during the repair or replacement process. These processes often result in estimates that are inaccurate and have a large variance in their total values, depending on the skills and/or biases of the individuals who create them.

Depending on the level of expertise of the estimator and her propensity to select certain part-types over others or her decision to repair certain parts instead of replacing them, estimates generated by different estimators result in different repair procedures and total costs. Studies have shown that three estimators from the same company, with the same training, using the same estimating software can each produce estimates for the same damaged vehicle that result in up to 15% difference in their total values. These same studies demonstrate that estimators that use different estimating software applications and work in different businesses such as a collision shop versus an insurance company or an independent adjuster can create estimates that result in differences of up to 25% in the total value of their estimates.

Current estimating systems that are utilized to create estimates for collision repairs often produce varying and inaccurate total estimate costs. In fact, these companies state that their systems are to be used only as a "Guide." Furthermore, the estimating process is time-consuming and expensive, as it is subjective and requires expertise on multiple levels. Given the tremendous amount of cost, training, time, special skills and knowledge that is required to effectively utilize today's estimating software applications, they are not effective for creating accurate repair estimates for a majority of vehicles that incur collision damage.

There is a need for a new system and method of estimating to estimate vehicle repair costs that is less complicated than the current systems and can produce estimates much faster without compromising accuracy. The new method should also be versatile enough to create estimates for vehicles of multiple years, makes, models and other characteristics without the need for the person creating these estimates to understand all the intricacies and peculiarities of each vehicle.

This new method should be able to factor out the variance of part prices, labor rate differences, and all other variances in order to produce an accurate estimate, as long as these differences can be objectively accounted for in the estimate being produced. Once the predictive analytics process is completed and the estimate is finalized, some or all of these factors can be presented in a simple form for users, insurance carrier staff, administrators, etc. to decide which ones should be applied to the estimate. An electronic procurement module, 113, that can effectively identify, source, price and procure all the parts necessary for a given repair and provide the means to determine the cost-effectiveness of each part for a given geographical location can aid in accomplishing the above tasks in real-time or near real-time.

The present invention represents such a new system and method.

Definitions

Unless stated to the contrary, for the purposes of the present disclosure, the following terms shall have the following definitions:

The term "app" is a shortening of the term "application software". It has become very popular and in 2010 was listed as "Word of the Year" by the American Dialect Society "Apps" are usually available through application distribution platforms, which began appearing in 2008 and are typically operated by the owner of the mobile operating system. Some apps are free, while others must be bought. Usually, they are downloaded from the platform to a target device, but sometimes they can be downloaded to laptops or desktop computers.

"API": In computer programming, an application programming interface API is a set of routines, protocols, and tools for building software applications. An API expresses a software module in terms of its operations, inputs, outputs, and underlying types. An API defines functionalities that are independent of their respective implementations, which allows definitions and implementations to vary without compromising each other. A good API makes it easier to develop a program by providing all the building blocks. A programmer then puts the blocks together. In addition to accessing databases or computer hardware, such as hard disk drives or video cards, an API can ease the work of programming GUI modules. For example, an API can facilitate integration of new features into existing applications a so-called "plug-in API". An API can also assist otherwise distinct applications with sharing data, which can help to integrate and enhance the functionalities of the applications. APIs often come in the form of a library that includes specifications for routines, data structures, object classes, and variables. In other cases, notably SOAP and REST services, an API is simply a specification of remote calls exposed to the API consumers. An API specification can take many forms, including an International Standard, such as POSIX, vendor documentation, such as the Microsoft Windows API, or the libraries of a programming language, e.g., Standard Template Library in C++ or Java API.

"API Toolkit": A toolkit is an assembly of tools; set of basic building units for user interfaces. An "API Toolkit" is therefore a set of basic building units for creating an application programming interface API.

Browser: a software program that runs on a client host and is used to request Pages and other data from server hosts. This data can be downloaded to the client's disk or displayed on the screen by the browser.

Client host: a computer that requests Pages from server hosts, and generally communicates through a browser program.

Content provider: a person responsible for providing the information that makes up a collection of Pages.

Electronic notification: any automated communication received by e-mail, phone, fax, text message, SMS, RSS or any third party software notification or alerting system.

"Electronic Mobile Device" is defined as any computer, phone, smartphone, tablet, or computing device that is comprised of a battery, display, circuit board, and processor that is capable of processing or executing software. Examples of electronic mobile devices are smartphones, laptop computers, and table PCs.

Embedded client software programs: software programs that comprise part of a Web site and that get downloaded into, and executed by, the browser.

"GUI": In computing, a graphical user interface GUI sometimes pronounced "gooey" or "gee-you-eye" is a type of interface that allows users to interact with electronic devices through graphical icons and visual indicators such as secondary notation, as opposed to text-based interfaces, typed command labels or text navigation. GUIs were introduced in reaction to the perceived steep learning curve of command-line interfaces CLIs, which require commands to be typed on the keyboard.

Host: a computer that is connected to a network such as the Internet. Every host has a hostname e.g., mypc.mycompany.com and a numeric IP address e.g., 123.104.35.12.

HTML HyperText Markup Language: the language used to author Pages. In its raw form, HTML looks like normal text, interspersed with formatting commands. A browser's primary function is to read and render HTML.

HTTP HyperText Transfer Protocol: protocol used between a browser and a Web server to exchange Pages and other data over the Internet.

HyperText: text annotated with links to other Pages e.g., HTML.

Internet-Based Icon: a graphical or text icon that is linked to this system's database and enables the initiation of contact between the Advisor and the consumer, which is located anywhere throughout the Internet including but not limited to websites, emails, directory listings, and advertisement banners IP Internet Protocol: the communication protocol governing the Internet.

An Internet service provider ISP is an organization that provides services for accessing, using, or participating in the Internet.

Server host: a computer on the Internet that hands out Pages through a Web server program.

A "mobile app" is a computer program designed to run on smartphones, tablet computers and other mobile devices, which the Applicant/Inventor refers to generically as "a computing device", which is not intended to be all inclusive of all computers and mobile devices that are capable of executing software applications.

A "mobile device" is a generic term used to refer to a variety of devices that allow people to access data and information from where ever they are. This includes cell phones and other portable devices such as, but not limited to, PDAs, Pads, smartphones, and laptop computers.

A "module" in software is a part of a program. Programs are composed of one or more independently developed modules that are not combined until the program is linked. A single module can contain one or several routines or steps.

A "module" in hardware, is a self-contained module.

"Photogrammetry" is the science of making measurements from photographs, especially for recovering the exact positions of surface points. Moreover, it may be used to recover the motion pathways of designated reference points located on any moving object, on its components and in the immediately adjacent environment. Photogrammetry may employ high-speed imaging and remote sensing in order to detect, measure and record complex 2-D and 3-D motion fields.

"Lasergrammetry" is a high-speed, non-contact measurement technology in which 3D coordinates of points on an object's surface are determined by projecting laser spots and utilizing advanced scanning methods to measure each spot's location.

A "software application" is a program or group of programs designed for end users. Application software can be divided into two general classes: systems software and applications software. Systems software consists of low-level programs that interact with the computer at a very basic level. This includes operating systems, compilers, and utilities for managing computer resources. In contrast, applications software also called end-user programs includes database programs, word processors, and spreadsheets. Figuratively speaking, applications software sits on top of systems software because it is unable to run without the operating system and system utilities.

A "software module" is a file that contains instructions. "Module" implies a single executable file that is only a part of the application, such as a DLL. When referring to an entire program, the terms "application" and "software program" are typically used. A software module is defined as a series of process steps stored in an electronic memory of an electronic device and executed by the processor of an electronic device such as a computer, pad, smart phone, or other equivalent device known in the prior art.

A "software application module" is a program or group of programs designed for end users that contains one or more files that contains instructions to be executed by a computer or other equivalent device.

A "smartphone" or smart phone is a mobile phone with more advanced computing capability and connectivity than basic feature phones. Smartphones typically include the features of a phone with those of another popular consumer device, such as a personal digital assistant, a media player, a digital camera, and/or a GPS navigation unit. Later smart phones include all of those plus the features of a touchscreen computer, including web browsing, wideband network radio e.g. LTE, Wi-Fi, 3rd-party apps, wireless motion sensor and mobile payment.

A "User" is any person using the computer system executing the method of the present invention.

URL Uniform Resource Locator: the address of a Web module or other data. The URL identifies the protocol used to communicate with the server host, the IP address of the server host, and the location of the requested data on the server host.

A "web application" or "web app" is any application software that runs in a web browser and is created in a browser-supported programming language such as the combination of JavaScript, HTML and CSS and relies on a web browser to render the application.

A "website", also written as Web site, web site, or simply site, is a collection of related web pages containing images, videos or other digital assets. A website is hosted on at least one web server, accessible via a network such as the Internet or a private local area network through an Internet address known as a Uniform Resource Locator URL. All publicly accessible websites collectively constitute the World Wide Web.

Web master: the person in charge of keeping a host server and Web server program running A "web page", also written as webpage is a document, typically written in plain text interspersed with formatting instructions of Hypertext Markup Language HTML, XHTML. A web page may incorporate elements from other websites with suitable markup anchors.

Web page: multimedia information on a Web site. A Web page is an HTML document comprising other Web modules, such as images.

The "Web pages" are accessed and transported with the Hypertext Transfer Protocol HTTP, which may optionally employ encryption HTTP Secure, HTTPS to provide security and privacy for the user of the web page content. The user's application, often a web browser displayed on a computer, renders the page content according to its HTML markup instructions onto a display terminal. The pages of a website can usually be accessed from a simple Uniform Resource Locator URL called the homepage. The URLs of the pages organize them into a hierarchy, although hyperlinking between them conveys the reader's perceived site structure and guides the reader's navigation of the site.

Web server: a software program running on a server host, for handing out Pages.

Web site: a collection of Pages residing on one or multiple server hosts and accessible through the same hostname such as, for example, www.topleveldomian.com.

SUMMARY OF THE INVENTION

The present invention is a method to create a fast and accurate repair estimate using a simple user-interface that relies on predictive analytics of a large number of existing estimates or structured estimate data for specific points-of-impact and vehicles in order to reliably estimate the total cost of repair for a given collision damage.

The present invention can evaluate millions of estimates previously written for vehicles similar to the one being assessed in order to produce a reliable repair estimate based on evaluation of all previous estimate data of vehicles that have incurred damage on the same points-of-impact, with similar extent-of-damage, presented as a number between 0, representing no damage, 1 representing the least amount of damage to 10, representing the maximum amount of damage. The present invention can also represent more granular extent-of-damage as a fractional value between each integer. While the current embodiment of the present invention has an upper limit of 10 levels of extent-of-damage, this upper limit can be modified to be any number in other embodiments.

The present invention allows the user to input in a form of guided pictures taken of the collision, and/or select a series of values, using a pointing device, or a finger on iPad, iPhone, Android, or any tablet/handheld device, as well as a Personal Computer, laptop, etc., and also receive input from various other sources such as carrier guidelines database, repair shop database, imaging and Photogrammetry database, Point-of-Impact (POI) to Universal Part-ID database, Lasergrammetry database, Telematics, Vehicle templates, On-board diagnostics boards, total-loss databases, etc., to query a database containing millions of previously written estimates for vehicles, or structured repair data specifically produced for this propose. The present invention then produces an estimate cost for repairing the damage and presents it as the output of the system.

The analysis employed by the present invention includes Bayesian modeling, a type of probability analysis by which the probabilities of certain results for some variables are increased or decreased, based on the results which have previously happened for other variables. This is useful in the context of collision damage, because when one part of a vehicle is damaged, it increases the likelihood that other parts near the damaged part or with direct correlation to damaged parts will also be damaged.

In another embodiment, the present invention utilizes the Probability Density Function "PDF", which describes the density of a continuous random variable by presenting the relative likelihood for this random variable to take on a given value. The probability of any given random variable to fall within a particular range of values is given by the integral of this variable's density over that range, resulting in a more accurate outcome for the estimated cost and suggested parts-lists, refinish and repair operations of the present invention. Other embodiments of the present invention utilize other techniques or methods including but not limited to: Bayesian techniques and/or networks; nearest-neighbors methods; k-means; support vector machines; hidden Markov models; decision tree methods such as random forests and/or extremely randomized trees; regression; neural networks; clustering; binary classifiers; multi-class classifiers; linear classifiers; quadratic classifiers; kernel estimation; connectivity-based clustering; hierarchical clustering; centroid-based clustering; distribution-based clustering; density-based clustering; partitioning algorithms; fuzzy logic; as well as variants of each of these methods. These methods and their combination may or may not employ a human-interpretable model. The output of each method is a vector of numbers, as defined above.

The present invention relies on the fact that the largest variance of a repair cost for collision damage lies in the cost of replacement parts necessary for the repair and the variance in labor rates of the party responsible for carrying out the repair. This is particularly helpful for comparison of the estimate being produced with that of plurality of existing estimates written for prior collisions similar to the collision under assessment. This process is performed by separating and normalizing the labor rates of prior estimates to a standard labor rate ensuring that the labor rate differences of previous repair data do not influence the comparison process.

Furthermore, the present invention also performs this normalization for cost of the parts necessary for the repair. It ensures that parts-costs are based on standard parts and standard costs during its comparison. The present invention normalizes all labor rates and parts costs for various labor operations and parts in order to compare estimates accurately and on an equal basis. Once this comparison is done and the proper estimate is produced the present invention then presents the user with the means to make the necessary labor and parts costs adjustments for the party performing the repair based on various factors such as: location of the repair; availability of parts; various labor rates for the repair; as well as ancillary costs such as towing, storage, etc.

The present invention takes into consideration thousands of historical examples for each vehicle and point-of-impact to generate a repair estimate in a matter of seconds or few minutes, versus the in-depth knowledge and expertise necessary and much longer time that is currently required to create an estimate with today's estimating software applications. Furthermore, these applications force the user to scrutinize each part and line item to ascertain the labor hours, repair vs. replace operations, cost and availability of the required parts, etc.

In one embodiment of the present invention, once driver of the vehicle, known as the consumer, or another individual creates the estimate using the system and determines the standard price for repairing a given vehicle, the present invention can make available all of this information and images of the current vehicle to a number of repair facilities who can then bid to win the given repair by modifying various aspects of the suggested estimate in order to reduce its cost. These actions can include but are not limited to: changing various labor rates to a lower amount, repairing more parts, reducing the total suggested labor hours, finding less expensive parts, reducing their overall profit margin on parts, etc.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 5. Adding parts missing from the suggested parts-list.

FIG. 12. Selection of alternate parts to the currently selected part.

Figure 14:
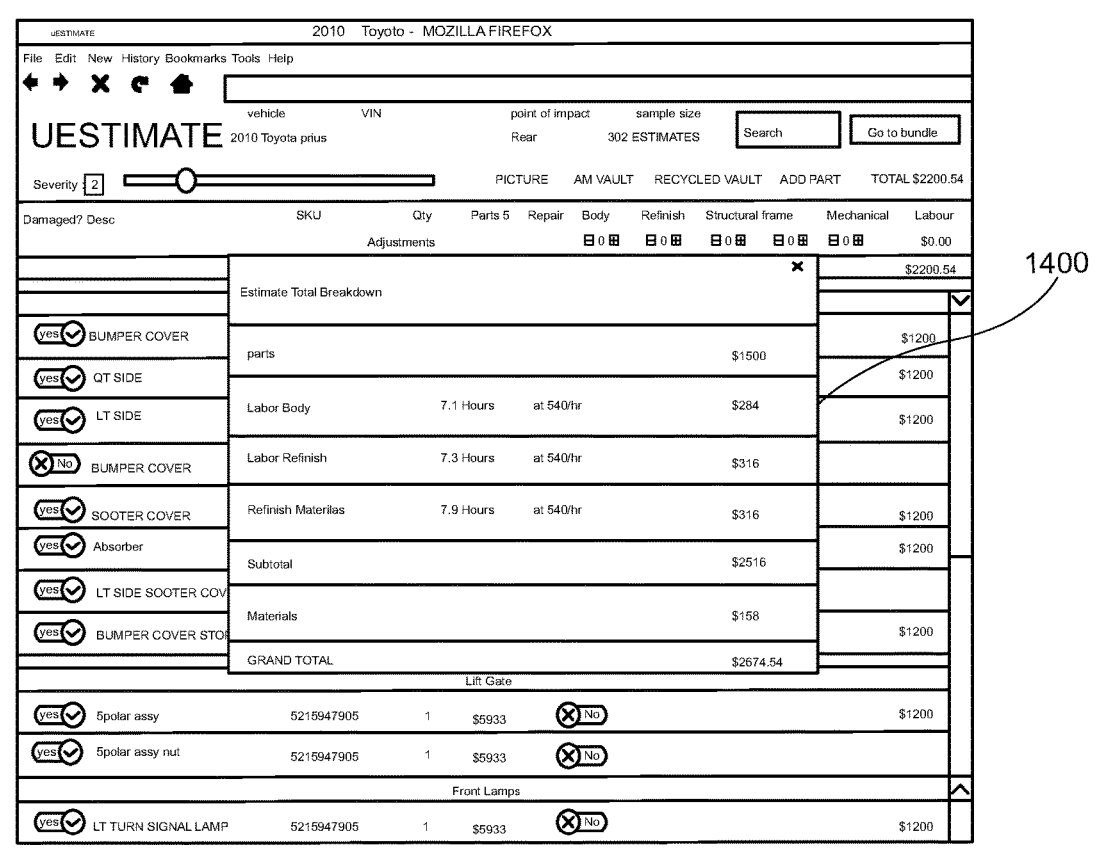

FIG. 14. Breakdown of total cost of repair, including parts, labor, refinish and materials FIG. 15. Examples of two aftermarket and recycled vaults as alternatives to currently selected parts.

FIG. 19. Integrated Manufacturer Recommended Repair Procedures display how the repair should be performed.

FIG. 23. Guideline Review demonstrates impact of various guidelines on the suggested estimate.

DETAILED DESCRIPTION OF THE INVENTION

The following description is demonstrative in nature and is not intended to limit the scope of the invention or its application of uses. There are a number of significant design features and improvements incorporated within the invention. The present invention is a method for generating a repair estimate through predictive analytics.

The present invention compiles and utilizes a database of millions of repair estimates consisting of structured data pertaining to repair estimates written for various vehicle years, makes, models and other characteristics, including various points-of-impact for each of those vehicles. The present invention systematically grades the extent-of-damage of each estimate associated with a collision repair and associates images of those damaged vehicles to specify an extent-of-damage for a given collision. If a minimum threshold of available structured repair estimate data has not been gathered for a given vehicle, the present invention provides a warning to the user as to accuracy of its suggestions, enabling the user to perform more manual tweaks in order to come up with the final results.

Figure 1:
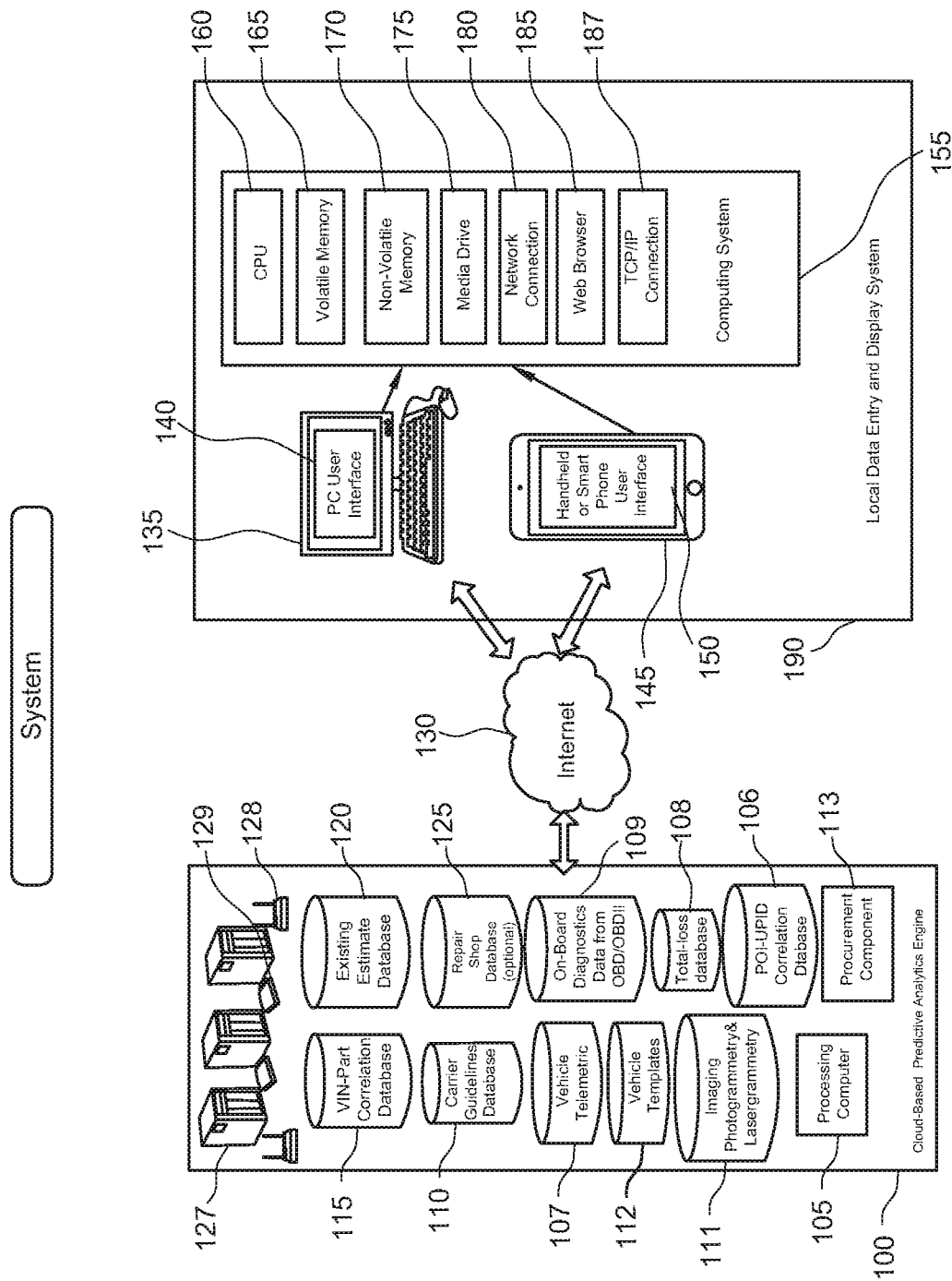
FIG. 1. Block diagram of an end-to-end system on which the predictive analytics engine operates from cloud-based servers to the IP cloud and then to the local user interface.

On a physical computer system level as shown in FIG. 1, the present invention comprises a cloud-based predictive analytics engine residing on cloud-based servers, comprised of servers 127, routers 128 and switches 129 on one side, and desktop/laptop 135 and/or handheld/smart phone 145 units along with their corresponding user interfaces 140 and 150, connecting to the predictive analytics engine 100, with an IP-cloud residing in the middle 130 as the top-level location-free communications medium between the two sides.

As part of the predictive analytics engine 100, the present invention comprises a processing module 105 and various databases including but not limited to: existing estimate database 120, which includes multiple images of the vehicle for each repair estimate, VIN-part correlation database 115, Vehicle Telematics Database 107, an optional Imaging and Photogrammetry database 111, Vehicle Templates 112 database, enabling further comparison of existing parts with that of predefined templates in order to identify damaged parts more accurately. Total-loss database 108, On-Board Diagnostics Data from OBD/OBD-II Database 109. Carrier guidelines database 110 and repair shop database 125. Furthermore, as more cars become equipped with Event Data Recorders EDRs, or black boxes similar to aviation, and data-gathering for vehicles becomes more sophisticated and readily available, one embodiment of the present invention takes into consideration these EDR data that can be collected in real-time in order to perform a more detailed and accurate analysis of the accident to produce a more accurate list and total cost of repair of the vehicle. For example, a severity level-3 damage indicator 420 that can be combined with the vehicle speed at the time of the collision, or the g-force of the impact of the vehicle will likely produce an estimate with a higher extent-of-damage based on a higher speed and g-force, versus one that has had a lower speed and g-force.

Furthermore, the present invention is comprised of a local data entry device such as a PC/laptop 135 and/or handheld/smart phone unit 145 each comprising a computing system 155 which, comprises a CPU 160 which performs local data processing; user interface 140, 150 operations, and also writes and reads to and from local volatile memory 165, non-volatile memory 170 and media drive 175. The CPU 160 is also responsible for addressing and transferring/receiving information to/from the cloud-based predictive analytics engine 100 servers 127 through routers 128 and switches 129 via the device's network connection 180 a web-browser 185, through TCP/IP connection 187 or through any other Internet-connected application.

Figure 2:
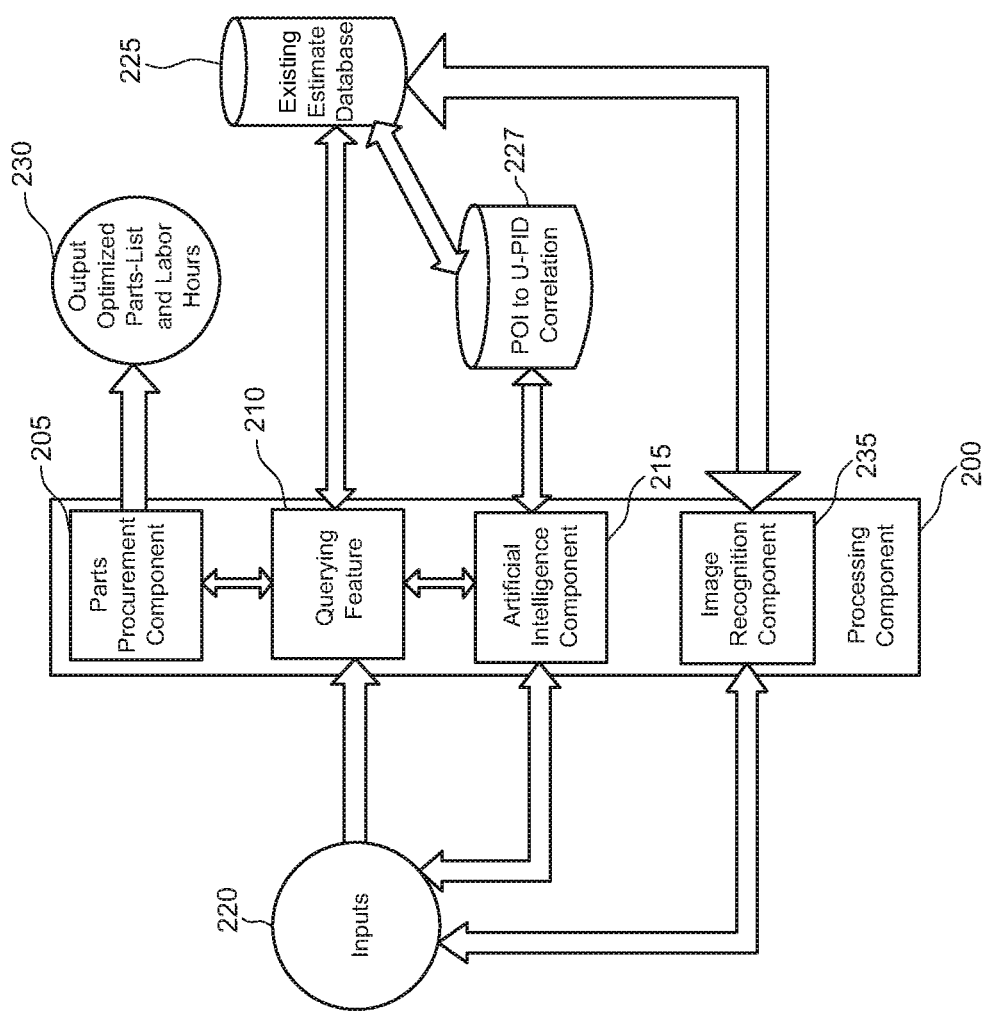
FIG. 2. Relationship between various modules of the predictive analytics engine including compute engines and databases.

To further elaborate on the server side aspects of the present invention, the processing module 200 as shown in FIG. 2 receives inputs 220 from various source depicted in Cloud-based predictive analytics engine 100 as well as data and/or images that the user has provided on her PC/laptop/smart-phone/browser 135 and/or handheld unit 145 and transmitted over the IP-cloud 130 to the data entry and display system 190, by generating a number of outputs, including but not limited to generating an optimized parts-list, refinish and labor hours 230 including results of the integrated procurement module 205 and updates to the existing estimate database 120 via an artificial intelligence module 215.

Figure 3:
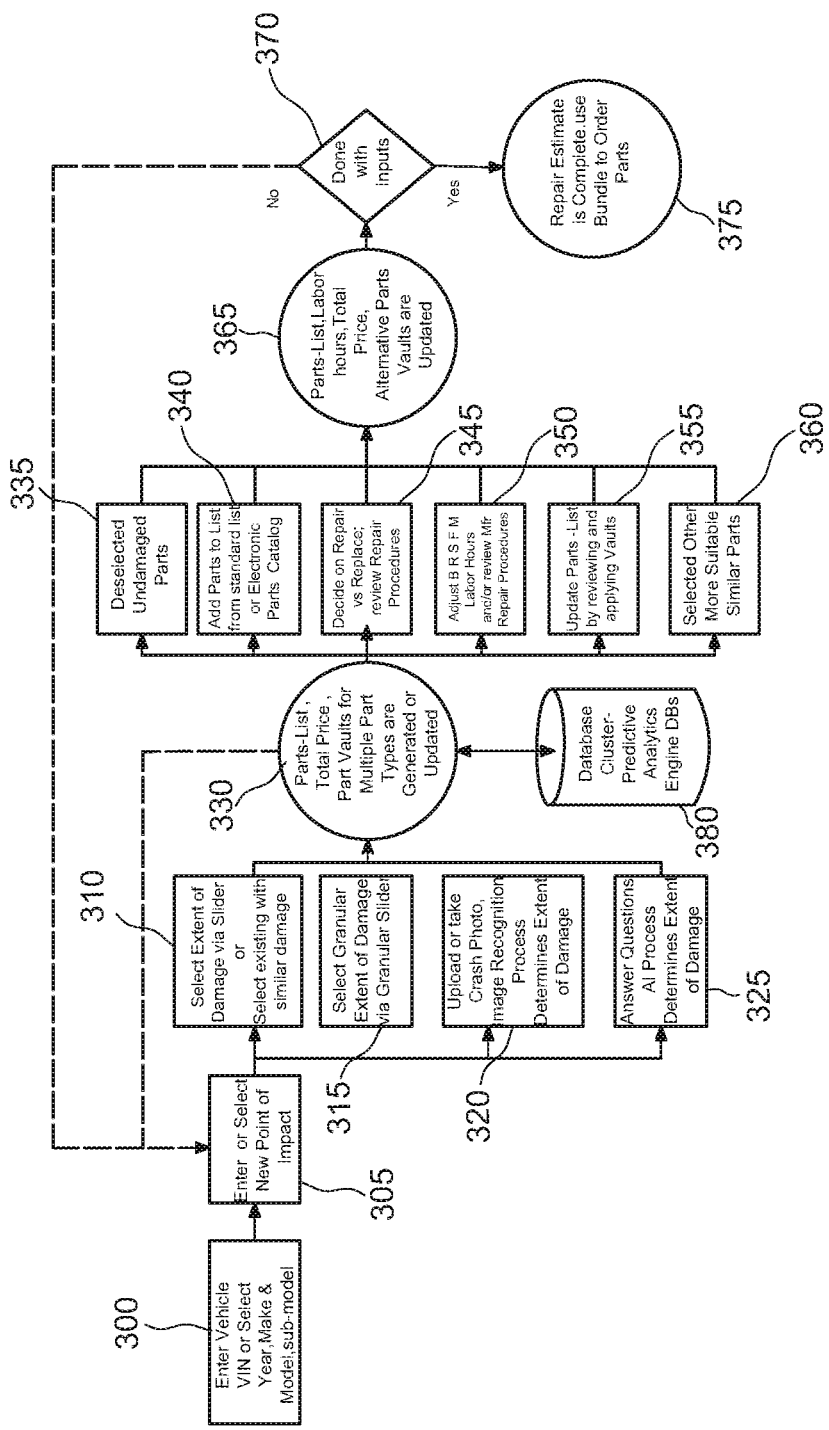
FIG. 3. Process flow including data entry, parts-list and output generation and the display process.

The local data entry and display system 190 can reside at any location with an Internet-connection and an Internet-ready device as shown in FIG. 3 and is responsible for: Receiving inputs and images from the user via the user interfaces 140 and 150 and databases in 100; Communicating the results to the Local Data Entry and Display System 190; Displaying the results on the user interface 140, 150 in real-time; Allowing for purchase of the parts on the parts-list from recommended parts vendors; and Providing requisite reports on various activities.

FIG. 3 describes the data selection/entry and process flow. The user starts with selecting the vehicle year, make and model using a pointing device, or entering the Vehicle Identification Number VIN of the vehicle involved in the collision 300. Note that the VIN can also be obtained through a VIN scanning device that may be attached to the user's hardware or be obtained through a photograph taken by the user's handheld, iPhone, Android, iPad, or other devices with an embedded camera or scanner. The user then selects the point-of-impact in the collision 305. Alternatively, the point-of-impact and/or the extent-of-damage can be selected by default based on the results produced by the Photogrammetry module of the present invention. At this point, the cloud-based predictive analytics engine 100 produces a comprehensive parts-list pertaining to the specific vehicle and the selected point-of-impact of the vehicle involved in the crash. The user then can further refine the extent-of-damage incurred in the collision, which in turn guides the present invention to produce a comprehensive list of parts and their associated labor hours necessary to complete the repair.

These steps include, but are not limited to the following actions that are either taken by the user, by the system or a combination thereof.

The user selects the crash level via an extent-of-damage level slider 420. As the slider moves, various images of vehicles most closely resembling the current extent-of-damage appear on the screen 2200, allowing the user to view which extent-of-damage most closely resembles the damage to her vehicle. The user can also specify the extent-of-damage by selecting existing images of similar vehicles with similar extent-of-damage 310 FIGS. 3 and 700 FIG. 7.

The user can optionally select the granular damage level via a granular extent-of-damage level slider 315.

The user can also take or upload one or more images of the collision 320. Taking of these images can be guided by a vehicle image template that allows the user to properly align the camera on the vehicle in order to produce images that are more useful for the present invention by having the correct distance, angle, lighting, etc. The image-recognition module 810 compares the image of the crash to a large number of available crash images residing on the existing estimate database 120 and using the Imaging and Photogrammetry database 111 generates a crash extent-of-damage level based on the outcome of the comparison processes. As an alternative option, images can be sent to third party evaluators who can perform the visual assessment and select a corresponding image manually.

The user can also answer optional questions that are pertinent to the crash 325. These questions are designed to provide additional information to enhance the determination of the extent-of-damage and severity of the collision.

The artificial intelligence module 215 takes into account the answers to these specific questions and fine-tunes its results-set in real-time prior to producing its output.

The above input methods are not mutually exclusive and any combination of all or some can increase the accuracy of the estimate produced by the present invention.

At this stage, the present invention generates a list of parts, refinish and labor hours necessary to repair the damage based on the selection of the extent-of-damage slider, selection of sample images most resembling the current collision and/or a plurality of other inputs. The querying feature generates a parts-list from the existing estimate database 120, and further refines its results by taking into consideration a set of queries and results from a cluster of databases 380 including, but not limited to the following.

A VIN-part correlation database 115. This database comprises information cross-referencing each part on the parts-list with the VIN number of the vehicle to further validate inclusion of correct parts on the list by the querying feature 210. This is done by cross-referencing each of the currently suggested parts against the VIN-part correlation database to determine if those parts are accurate for the given VIN of the vehicle under assessment.

A Carrier guidelines database 110. This database includes specific guidelines of each insurance carrier with regards to various aspects of the repair such as minimum percentage of recycled parts to be used for the repair, minimum percentage of aftermarket parts to be used for the repair, repair versus replace ratios, disallowable part categories for certain part types, necessary part certifications on certain part types, as well as many other guidelines. The querying feature 210 then generates a parts-list that adheres to the vehicle's underlying insurance carrier's requirements if any pertaining to this specific crash/vehicle under consideration.

The present invention can also receive information from the Vehicle Telematics database 107 to further refine its results based on various datasets that were gathered at the time of, or prior to the collision, if available, and in order to further refine its results.

The Imaging and Photogrammetry database 111 of the present invention can also provide input by providing details of photographs and/or 3D images of the vehicle under assessment that can aid the current database in further refining its result-set. This can also be done through Vehicle Templates 112 which describe each section of a specific vehicle and what parts they include. This is done by identifying additional parts that may have been damaged in the collision that are identified by the imaging and Photogrammetry or Lasergrammetry module, or by removal of parts that are identified as not damaged by the imaging module. The results of the Photogrammetry analysis can be automatic selection of the correct points-of-impact as well as default suggestion on the proper extent-of-damage, parts-lists, paint materials/labor and repair line-items necessary for the repair.

The POI (Point-of-Impact) to Universal Part ID Correlation database 106 aids the present invention to more effectively determine what parts are typically damaged when a certain point of impact with a certain severity level has incurred a collision. The present invention keeps track of these POI to Universal Part ID 227/106 correlations and constantly updates them through its Artificial Intelligence module 215, to be utilized for processing by the Processing Component 105. This Processing Component 105, enables the present invention to continually accumulate these cross-references and utilize them in the future to increase the accuracy of its suggestions. This is done by learning which Universal-Part-IDs correlate to which Points-of-Impacts for a given vehicles, ensuring a more accurate selection and exclusion of parts as the POI to Universal Part ID database creates these connections.

While the present invention is processing these datasets and producing its results it monitors the total value of the estimate in real-time against the Total Loss-database 108 to ensure that the total value of the repair does not exceed a predefined threshold of the total-loss value of that given vehicle. This is done to ascertain whether or not it is more cost effective to declare the vehicle a total-loss instead of repairing it. When this threshold is exceeded an alert is immediately displayed on the main user interface of the present invention as depicted in 1715 of FIG. 17.

The present invention can also take input from the vehicle's On-Board Diagnostics board, either through a local connection such as blue-tooth interface that can read such data inside the vehicle or through other means that such data may be collected and available in any database such as the On-Board Diagnostics Data from OBD/OBDII 109. The present invention then uses this information to further refine its results by taking into account various metrics related to the accident such as speed of travel at the time of accident, direction of travel, malfunction indicators, Ambient Air Temperature, Engine Oil Temperature, Engine Coolant Temperature, Boost, Vacuum, Horsepower, Fuel Intake, Engine RPM, Engine Throttle, Torque, etc., all of which can be taken into consideration by the present invention's Processing Module 105 when producing its result-set.

Repair shop database 125 is optional for when a repair shop has already been selected and can contain preferences of the repair shop to be taken into consideration when generating the list of parts and labor necessary for the estimate, if the estimate is being generated for a specific shop or a multi-shop-operator. Otherwise, standard criteria will be applied to the estimate. These preferences and requirements can dictate local and federal government guidelines, as well as shop-specific requirements that need to be applied to the estimate generation process.

A Repair shop database contains the address and geographical location of the shop which enables the procurement component 113 of the present invention to locate the availability, delivery time and price of the parts necessary for the repair based on their proximity to the repair shop. However, if the Optional Repair shop database is not available and a shop is not determined, the present invention relies on the GPS location of where the present invention was utilized and/or on user input which requires the user to enter such location in order to search and locate parts and materials closest to the location of the potential repair, using the procurement component 113 of the present invention.

Figure 18:
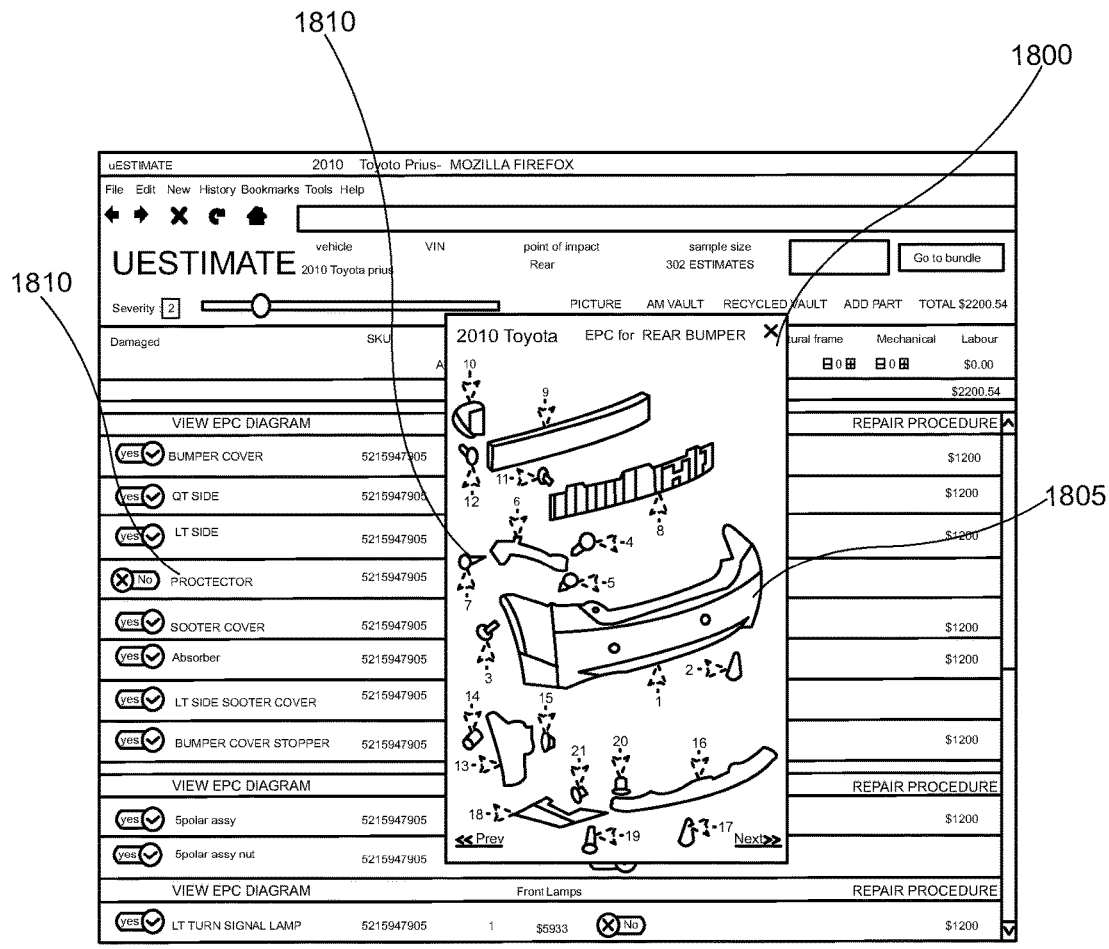
FIG. 18. Integrated Electronic Parts Catalog allows selection of parts based on diagrams/images.

Users can perform the following tasks in order to provide more specific information to overwrite the suggestions that were made by the present invention. Deselect parts on the list that are not damaged or do not need repair or replacement 335. Add parts 340 that are not automatically added to the parts-list 365. These parts can be added from a standard list of parts to be added—FIG. 5—500 or from a manufacturer's Electronic Parts Catalog 1800 that is automatically discoverable through a set of web-services and integrated in the present invention, allowing the user to review the manufacturer's complete catalog on a section-by-section basis in order to add or remove parts to the estimate produced by the present invention. As shown in FIG. 18.

Figure 19:
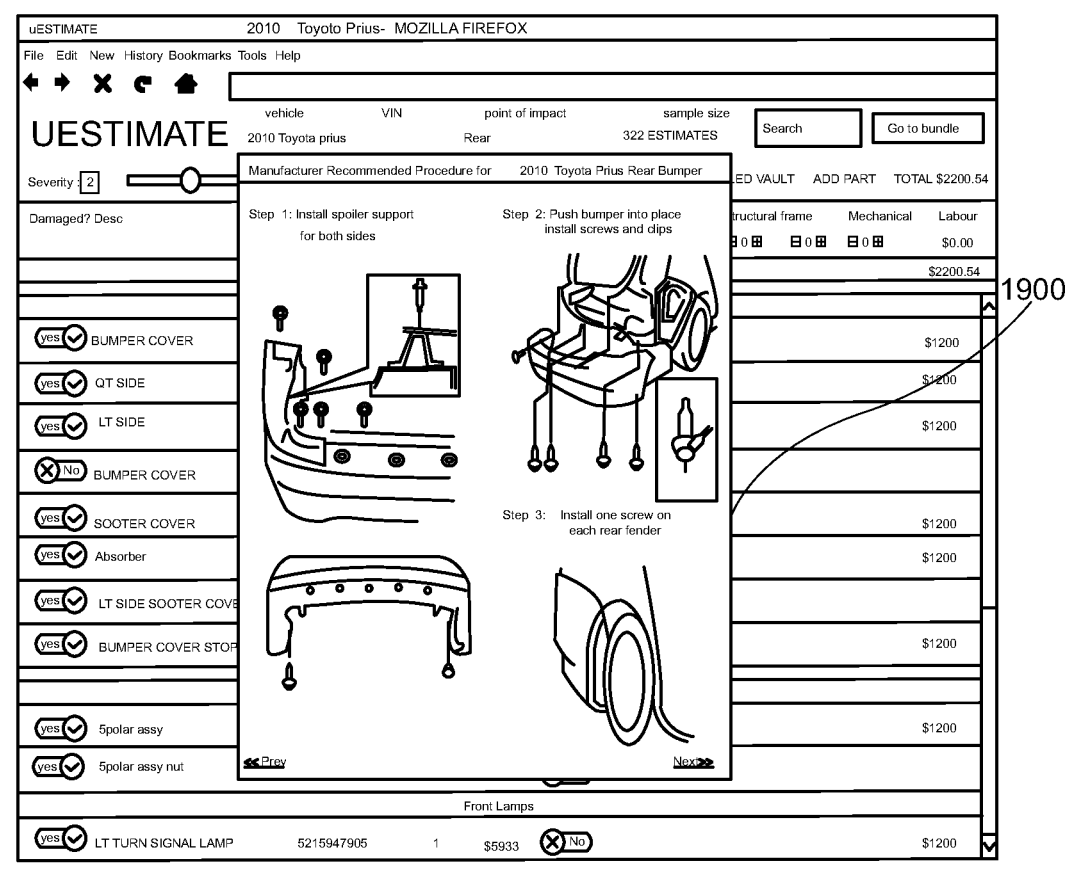

While repair vs. replace decisions can be made through input from various databases described in the Cloud-Based Predictive Analytics Engine 100, the user can perform repair vs. replace of each part 345 manually. This can be done through examination of damaged parts and/or review of the Integrated Manufacturer Recommended Repair Procedures offered by each vehicle's manufacturer. As shown in FIG. 19. Furthermore, the Photogrammetry component of the present invention provides input further aiding the repair vs. replace decision making process.

Figure 10:
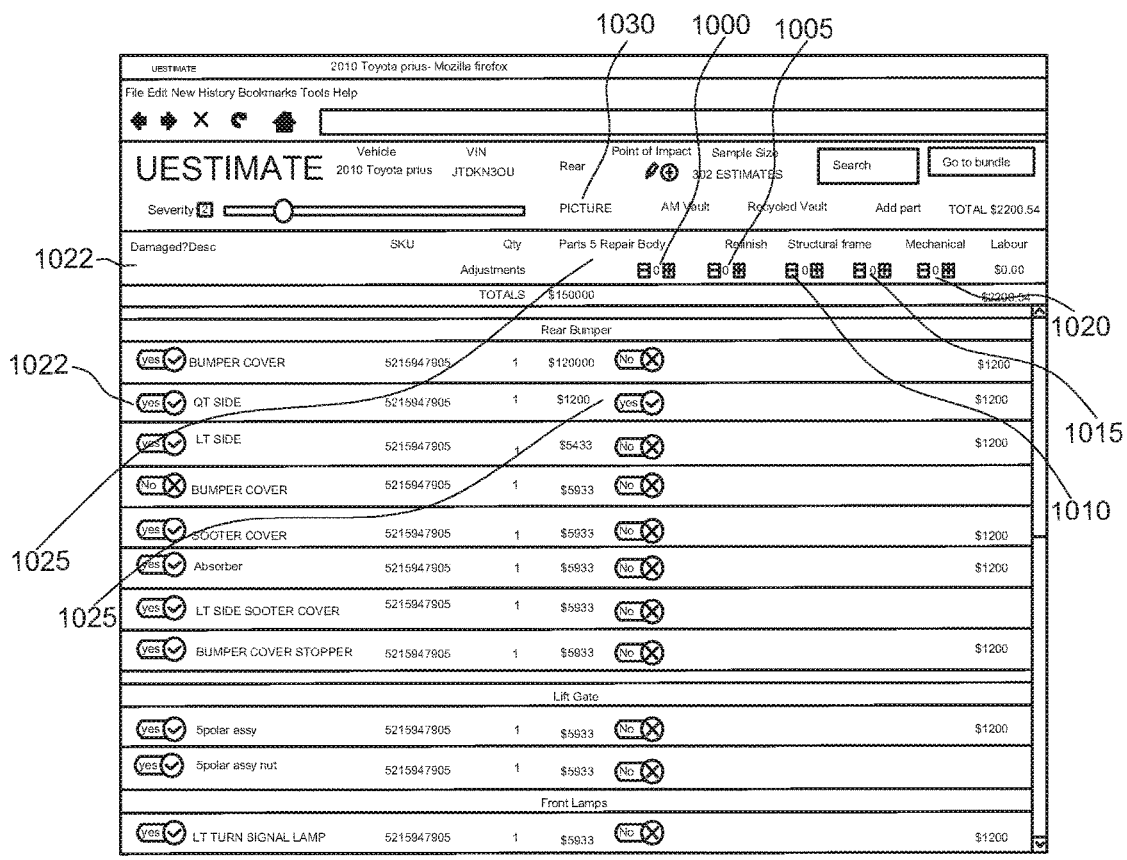
FIG. 10. Various overall labor adjustment options to the estimate.

The user can also adjust the overall labor hours deemed required for Body 1000, Refinish/paint 1005, Structural 1010, Frame 1015 and Mechanical 1020 work 350. As shown in FIG. 10. These adjustments can be made based upon review of the integrated manufacturer recommended repair procedures that can be easily accessed through a web-service call to the manufacturer directly or from the cloud-based servers of the current application, in the user interface of the present invention. As shown in FIG. 19.

Figure 15:
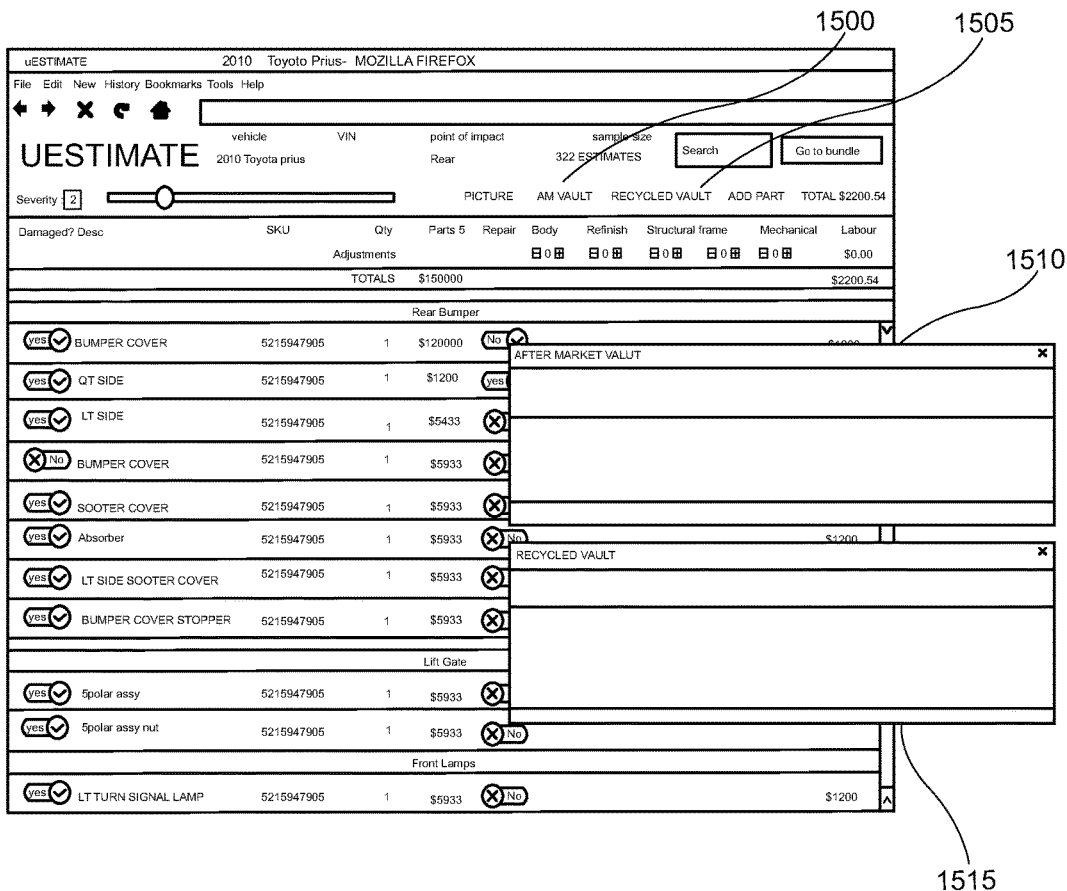
Figure 16:
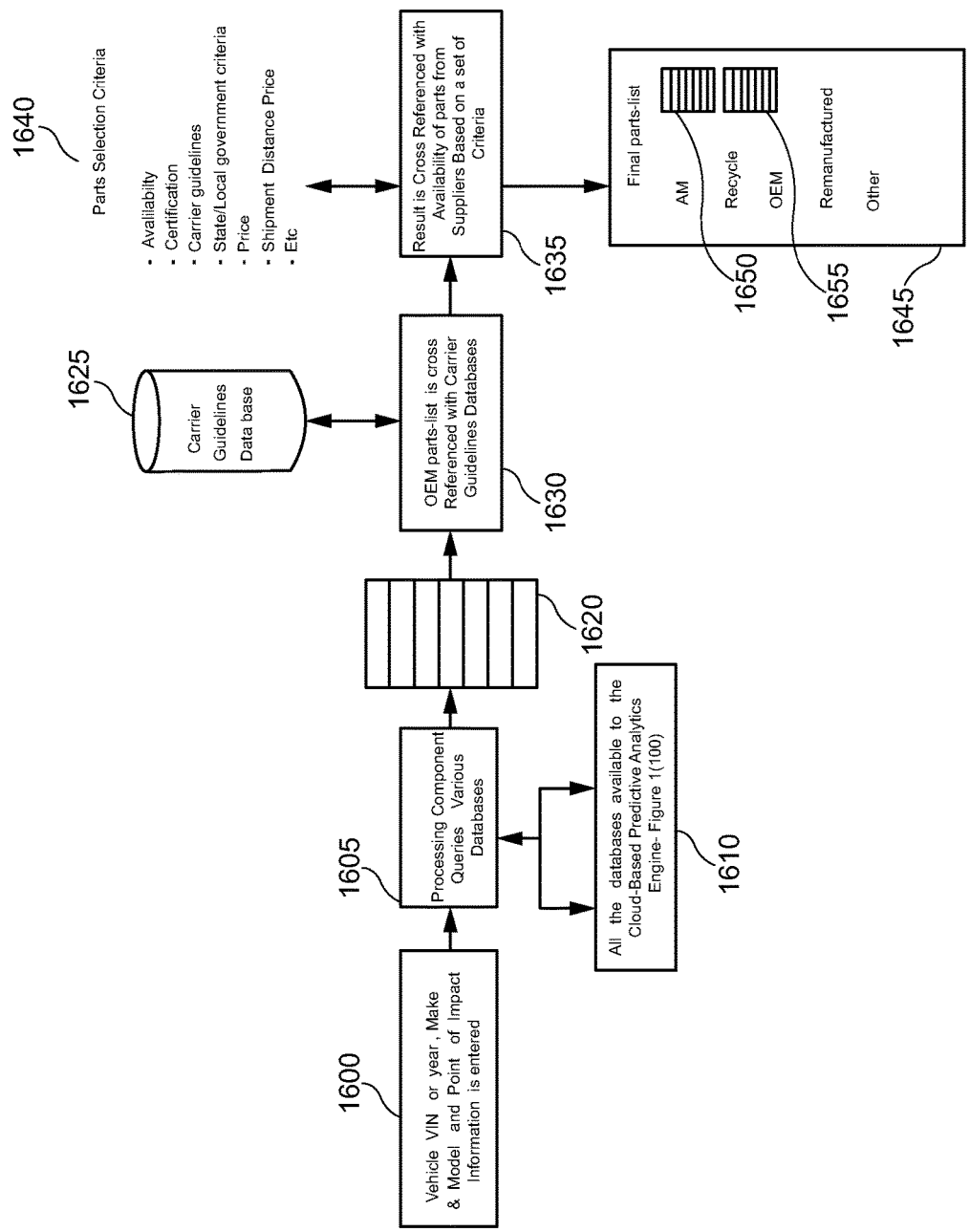
FIG. 16. Real-time process for generating final parts-list.
Figure 17:
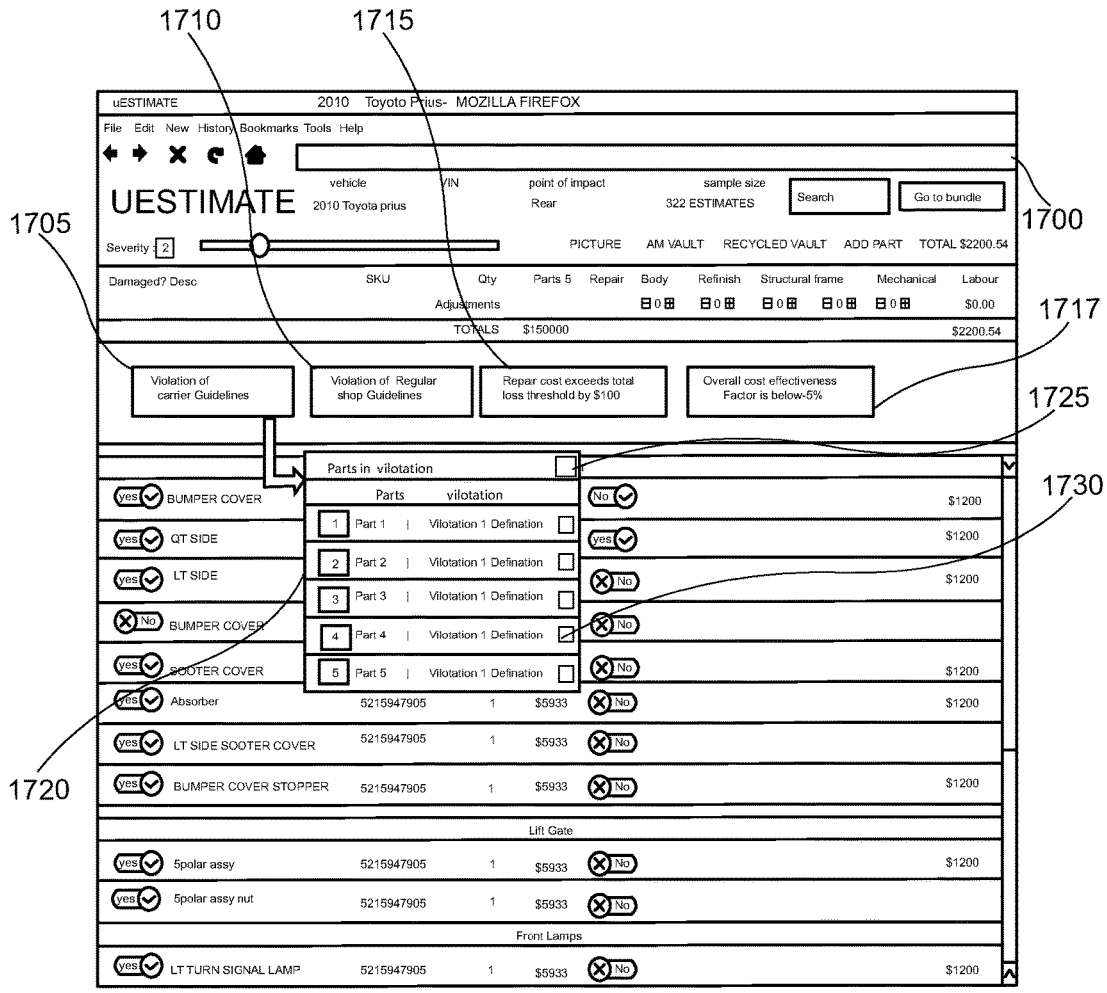
FIG. 17. Real-time audit and compliance Alerts, Warnings and Reminders.

Review of available alternative parts in the form of part vaults by the user can also reduce the overall cost of the estimate. These alternative parts can include discounted OEM, aftermarket, recycled, remanufactured or other parts available in the form of part-vaults 355 from the parts procurement module of the present invention FIG. 15 and can be easily applied to the estimate in order to further reduce the overall cost of the repair based on the availability of these lower cost parts. In one embodiment of the present invention, these additional part vaults are generated in real-time as dictated by predefined Guidelines available to the present invention, As shown in FIG. 23, and applied to the results of the present invention automatically. This step allows the user to further review these suggestions and make additional changes. Also, if application of these part-vaults result in any violation of any of the guidelines provided in various databases, the use will be alerted to such violation and the violation will be logged by the present invention— As shown in FIG. 17.

Figure 12:
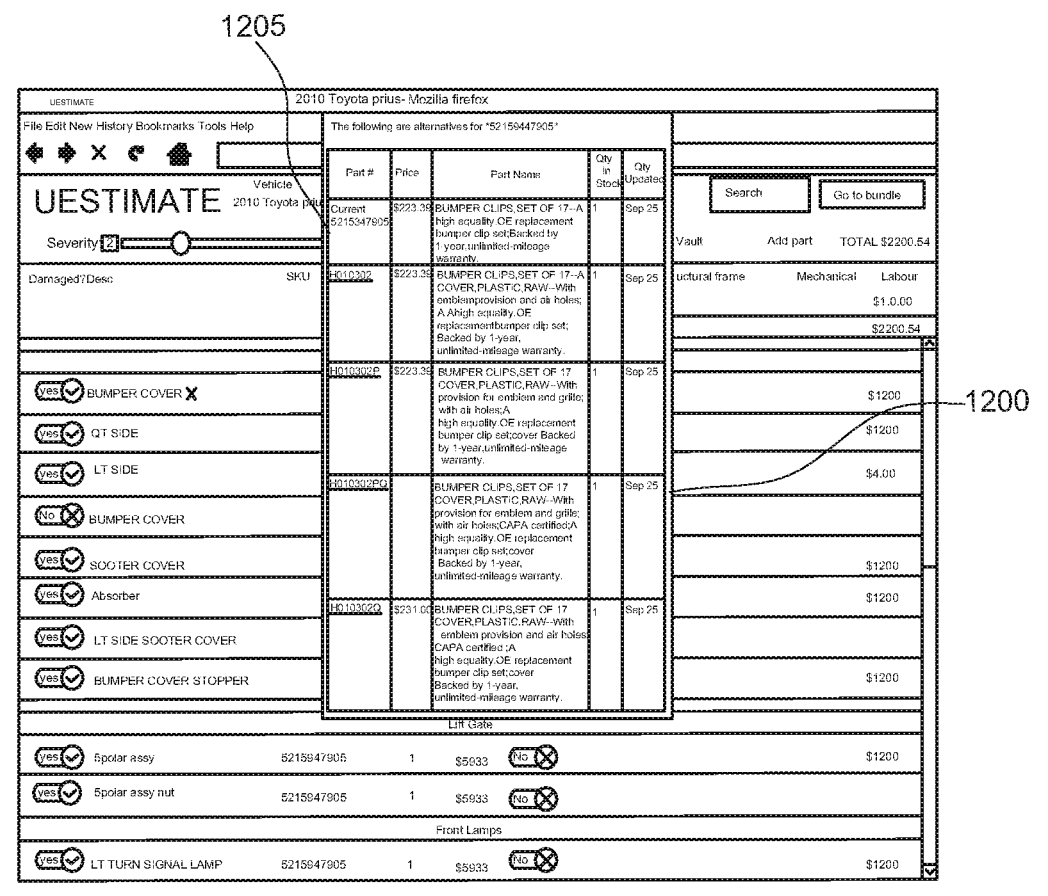

Selection of more suitable parts 360 out of these alternate part suggestions 1200. These are more suitable parts that are deemed to be more appropriate for this particular repair job from a list of more suitable parts-list that may be available as alternatives to the parts suggested by the present invention or a given part-vault. As shown in FIG. 12.

In one embodiment of the present invention the parts-list and repair entries are updated automatically as the user performs one or more of the above tasks. In another embodiment, the updates are presented to the user for review prior to being updated to the parts-list and repair entries.

The present invention enables the user to select more than one point-of-impact for the collision under assessment by moving the pointing device over the Point-of-Impact indicator 415, until an edit icon or a plus sign icon appear. The user can then change the point-of-impact or add a new point-of-impact by clicking on the Plus sign next to the current point-of-impact. In such cases that there are more than one-point-of-impact, once the parts-list is generated for the first point-of-impact, the user can go back 370 to the point-of-impact entry selection point 305 and select an additional point-of-impact using the plus sign icon 415. In cases where one or more additional points of impact are selected, the present invention properly merges and creates a union of the parts, labor and refinish operations that are necessary for all points-of-impact. This union is not the sum of all parts-lists generated through each cycle of points of impact. In fact, the artificial intelligence module 215 of the present invention holistically combines these multiple lists into a final list that comprises only the required parts for the repair. Furthermore, it can optionally utilize a VIN-Part Correlation Database 115 to determine the superset of all the parts that are necessary for the repair prior to narrowing down that list in conjunction with the results derived from its existing estimate database.

Figure 20:
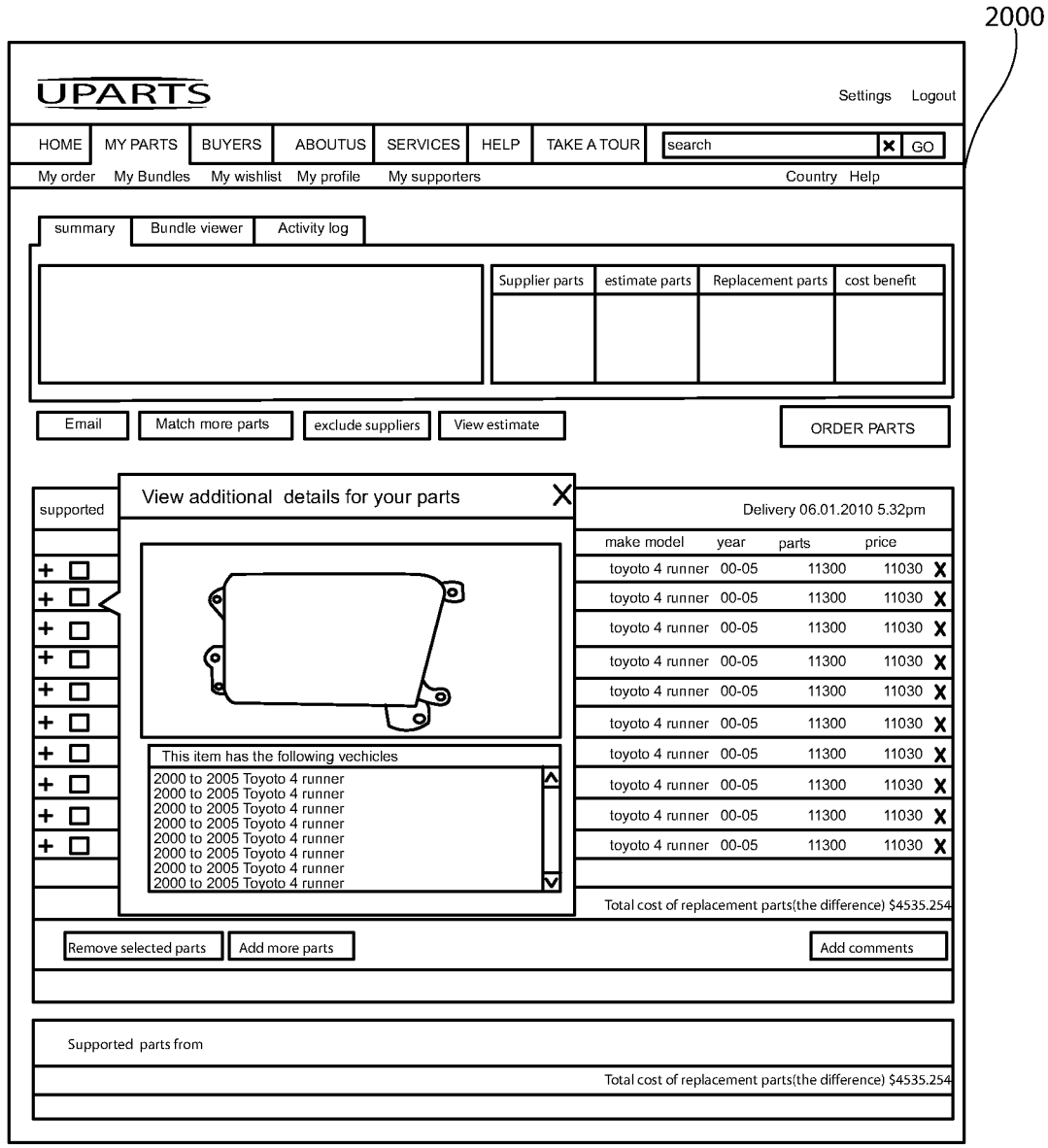
FIG. 20. Bundle interface enables procurement of all parts with a single click
Figure 21:
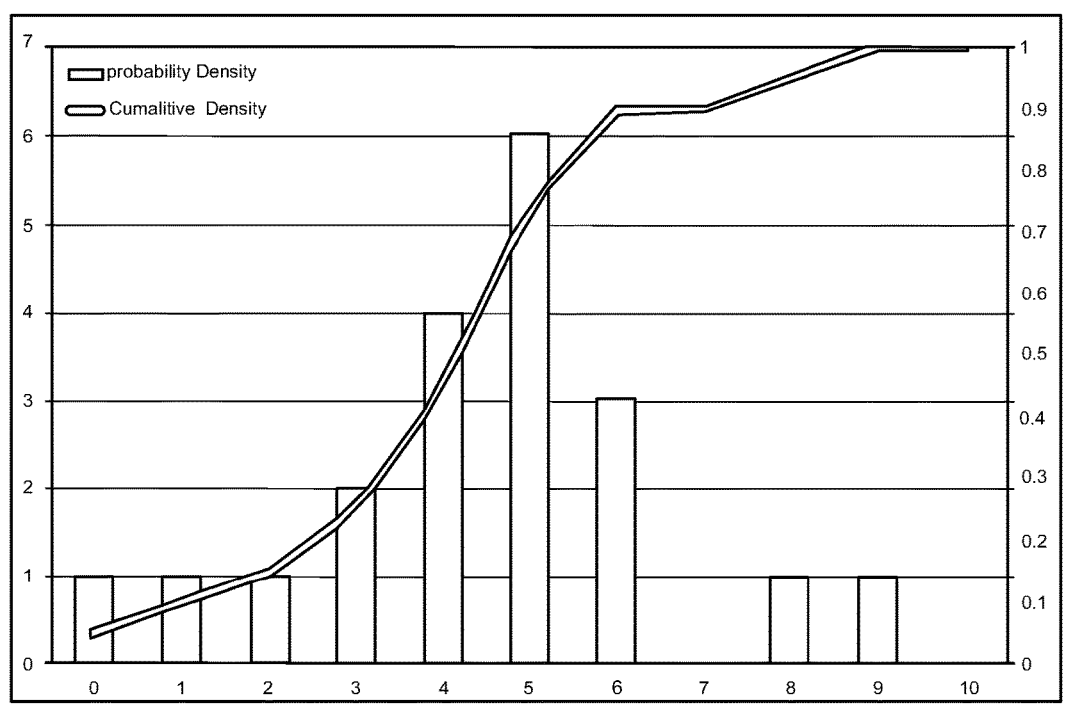
FIG. 21. Typical probability density and cumulative probability density functions.

Once the user is done with all entries, she can order the required parts with a single click of the mouse through the Bundle interface 440, which displays the bundle interface from the parts procurement component 113 of the current interface 2000. The Bundle Interface contains a full list of all the parts necessary for the repair. This list has been qualified and validated against all suppliers to the Bundle. All the parts on the Bundle interface can be obtained from all suppliers by a single click and kept track of using the parts procurement module 113 of the present invention. As shown in FIG. 20.

In another embodiment of the present invention, the consumer or any user of the present invention uses the current steps to create an estimate that contains the details of all parts, refinish material and labor hours necessary to repair the current vehicle. This process produces a standard price for repairing such a vehicle. In this embodiment, the present invention can forward this information, including photographs of the current collision of the current vehicle and its full estimate to a number of repair facilities who can then modify the estimate by either of the following actions, and submit their desire to repair the given vehicle for possibly a lower price than suggested by the present invention by one, but not limited to the following actions: Reduction of standard labor rates; Lowering the recommended number of labor hours for various repair types such as Body, Refinish, Structural, Frame, Mechanical, etc.; Repairing more parts than suggested by the generated standard estimate; Procuring less expensive parts such as aftermarket, recycled, remanufactured, discounted OEM, etc.; Reducing profit margins on the specified parts; Or other actions that may result in a lower repair cost.

Up to this point, the general operation and modules of the predictive analytics engine 100 have been explained. Henceforth, the specifics of inputs and outputs of the system will be explained in more detail.

The inputs to the system can be divided into two levels: Level 1 and Level 2. Level 1 inputs lead to generation of an initial parts-list and Level 2 inputs further refine and optimize the parts-list generated by Level 1 inputs.

Figure 7:
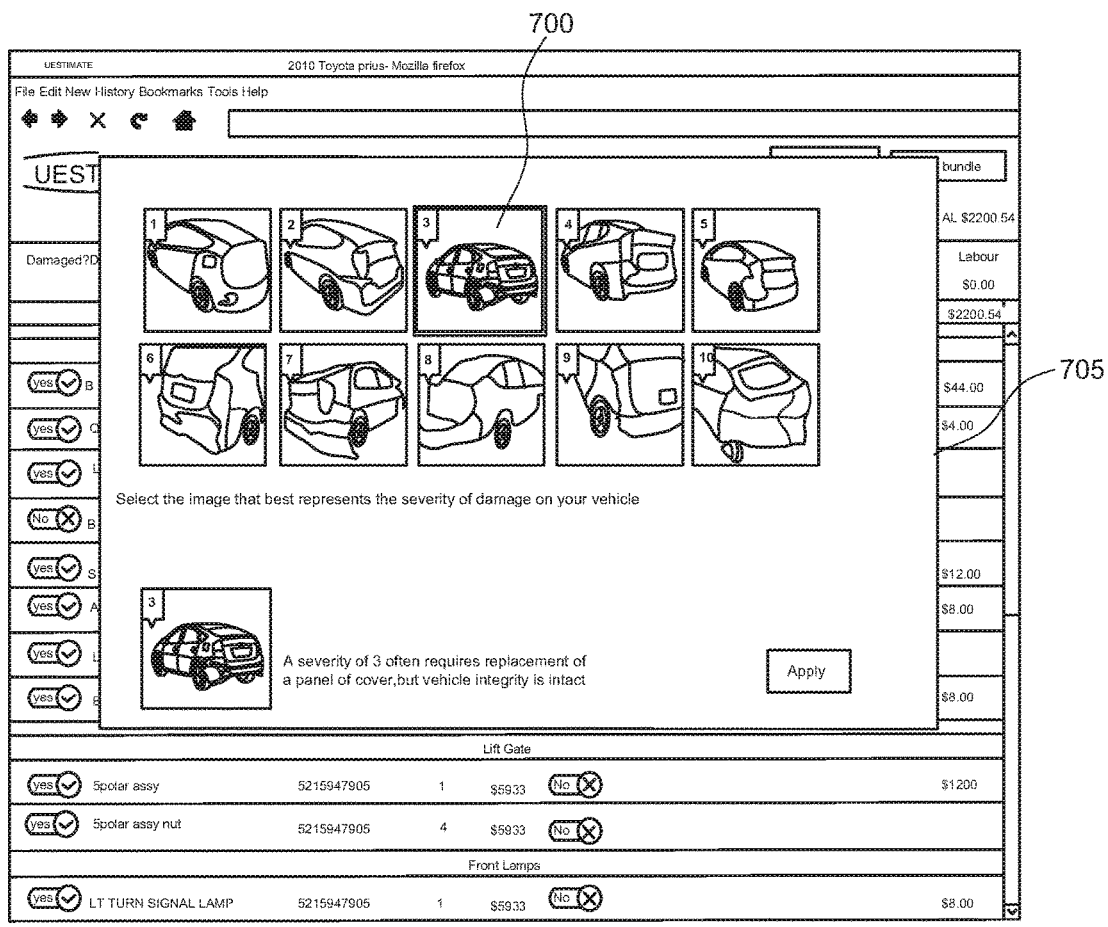
FIG. 7. Visual extent-of-damage selection based on sample images.
Figure 8:
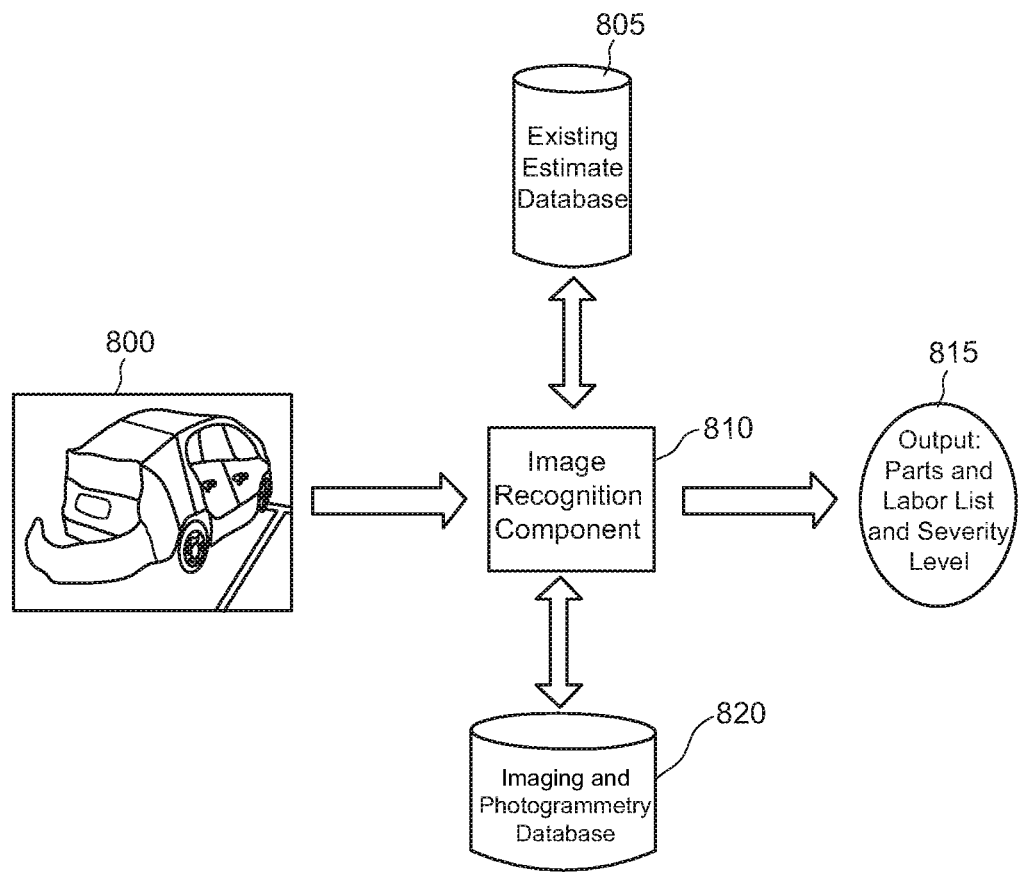
FIG. 8. Extent-of-damage selection based on Image recognition and correlation with images in imaging and Photogrammetry database and Existing Estimate Database.
Figure 9:
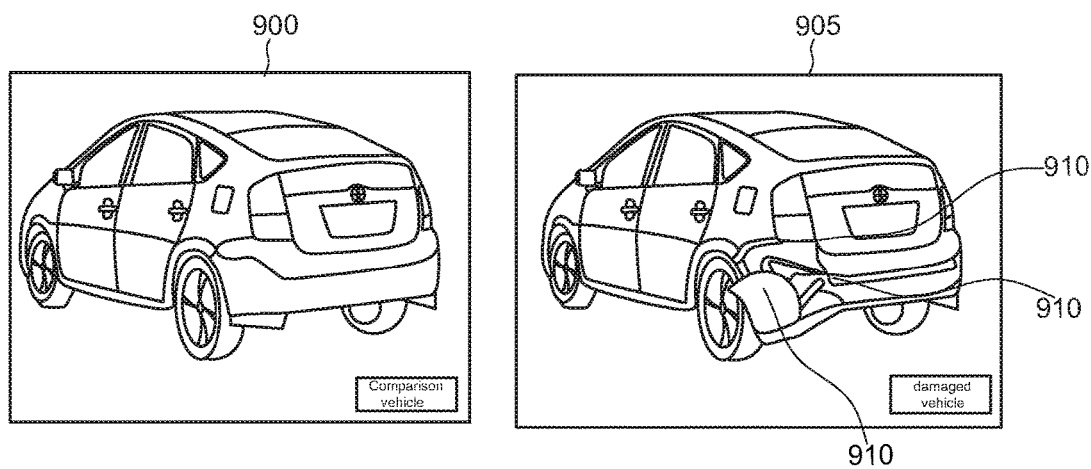
FIG. 9. The Photogrammetry module automatically determines the extent-of-damage of the collision.
Figure 11:
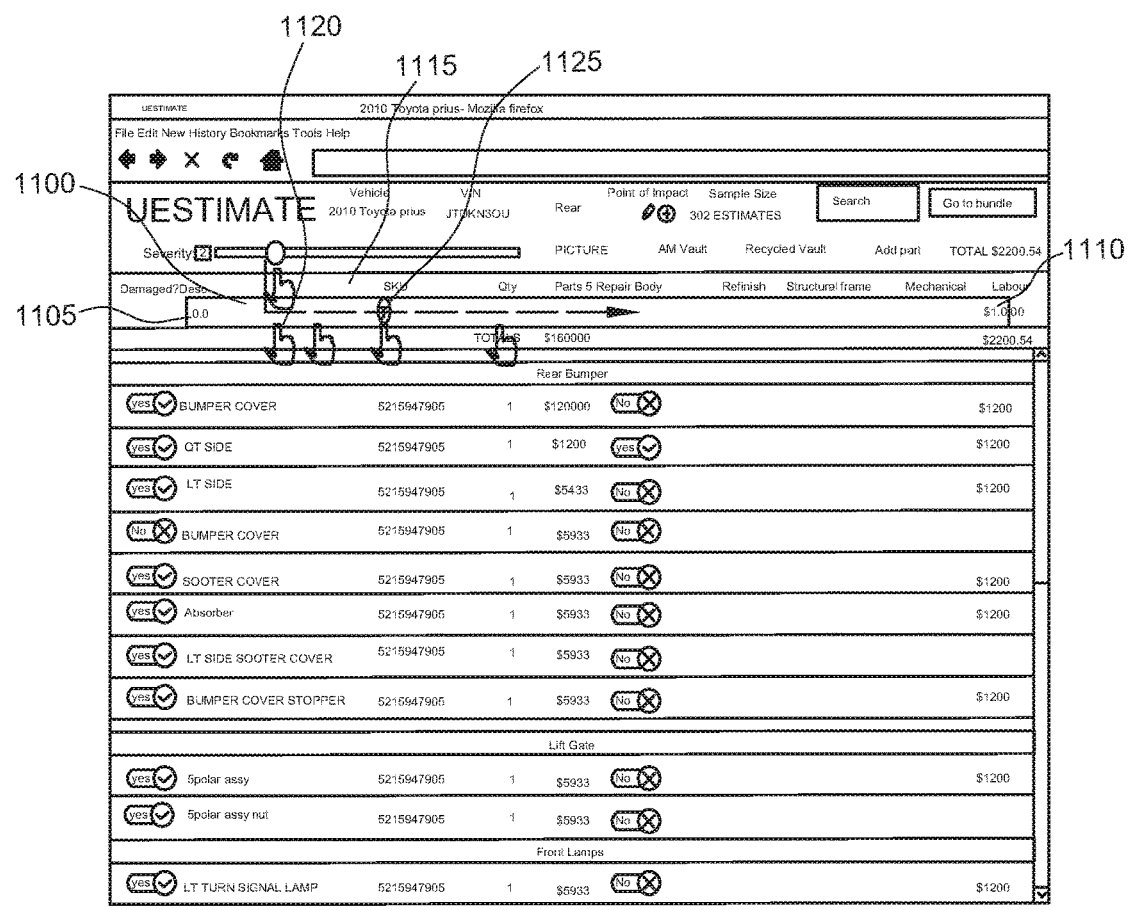
FIG. 11. Granular crash severity slider input enables the user to select more detailed extent-of-damage.
Figure 13:
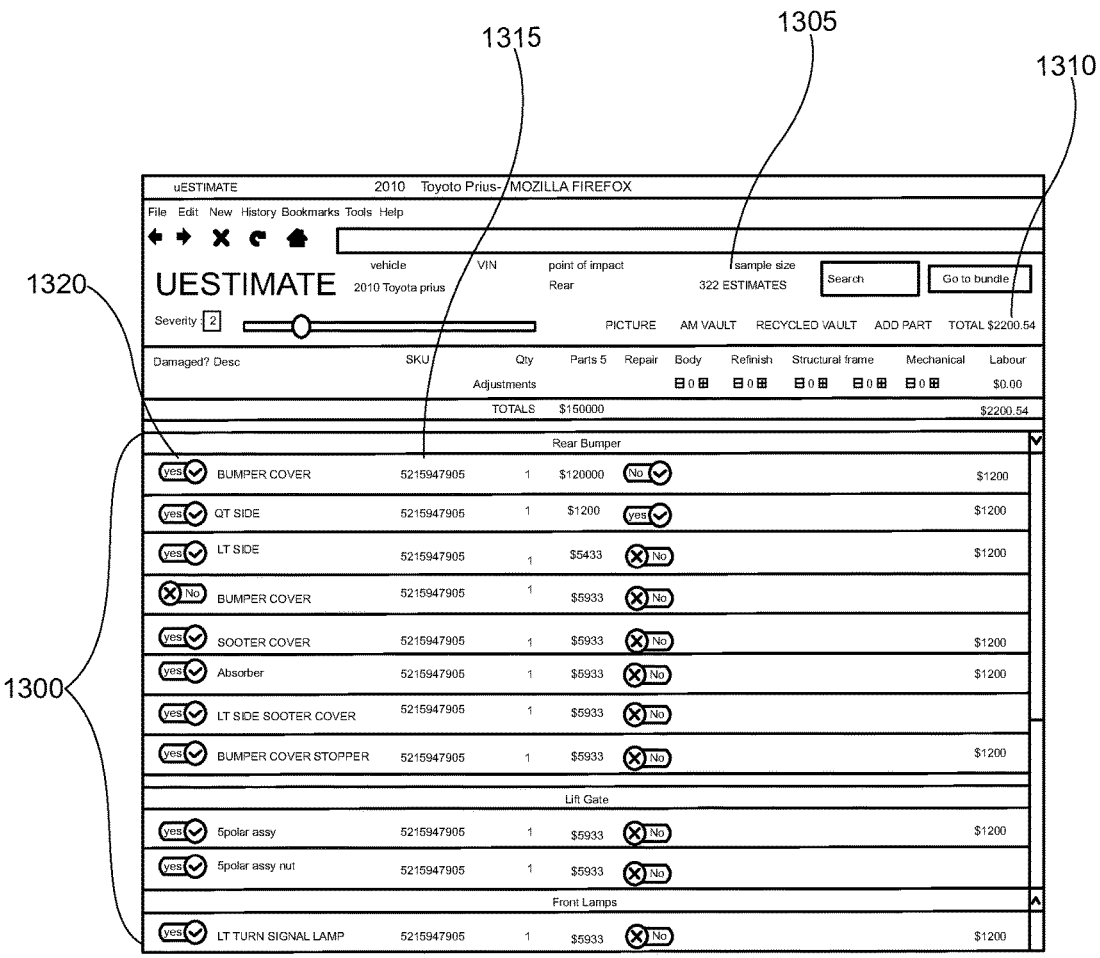
FIG. 13. Parts-list, labor operations and total estimate cost are generated in real-time as the slider is moved.

Level 1 inputs include but are not limited to: Top-level collision information entered in the user interface 400 on FIG. 4, including but not limited to vehicle year/make/model 405, VIN 410 and point-of-impact 415 where the user can select or enter any of the above information; Crash extent-of-damage severity level indicator slider 420; Selection of Granular crash extent-of-damage as shown in FIG. 11; Changes to the damage indicators 435 and 1022, specifying whether or not a given part is damaged as indicated by the present invention; Repair vs. replace as shown in FIG. 10 selector for individual damaged parts 1025; Extent-of-damage selection based on sample images as shown in FIG. 7; Extent-of-damage selection based on image recognition and Photogrammetry FIG. 9 using the images in the existing estimate database 805 and Imaging and Photogrammetry database 820 as shown in FIG. 8, which can result in automatic selection of point-of-impact and default selection of the extent-of-damage, including the granular extent-of-damage.

Figure 5:
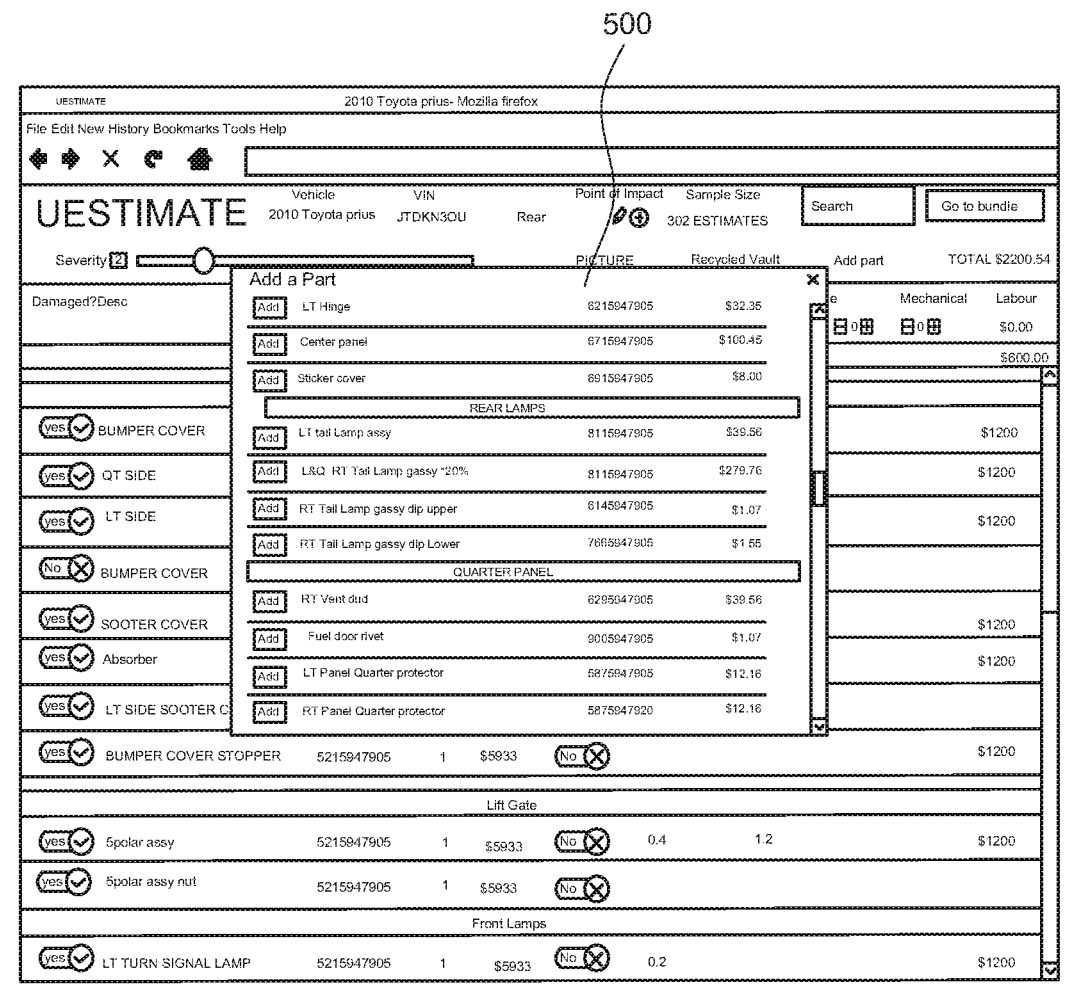

Level 2 inputs include but are not limited to: Adding parts of potentially missing parts to the Parts-list 500. As shown in FIG. 5; Electronic Parts Catalog parts selector for visual parts addition and removals. As shown in FIG. 18; Labor hours adjustment as shown in FIG. 10 for Body 1000, Refinish 1005, Structural 1010, Frame 1015 and Mechanical 1020; Selection of alternative similar parts as shown in FIG. 12; A Manufacturer Recommended Repair Procedure 1900 enables the user to review and utilize the manufacturer repair procedures in order to follow the proper repair methodologies as recommended by the manufacturer. As shown in FIG. 19.

Once one, some or all of the above inputs are provided by the user in the user interface 400, the following outputs are generated as shown in FIGS. 13, 14, 15 and 17, 18, 19 and 23: A complete parts-list, refinish material and labor operations 1300; Part Numbers, or Stock Keeping Unit SKU for every part on the list 1315; Total number of estimates or sample size 1305 of the samples in the existing estimate database that were analyzed to generate the current final parts-list 1300; Total cost of the estimate 1310 and breakdown of the cost 1400; Aftermarket and recycled vaults 1510 and 1515, as well as vaults for other part-types such as OEM, Remanufactured, Sublet, etc.; Cost-Effectiveness-Factor CEF of individual parts and the estimate as a whole. Evaluation of the CEF factor can result in an Alert to the user 1717 and/or the insurance carrier.

Figure 6:
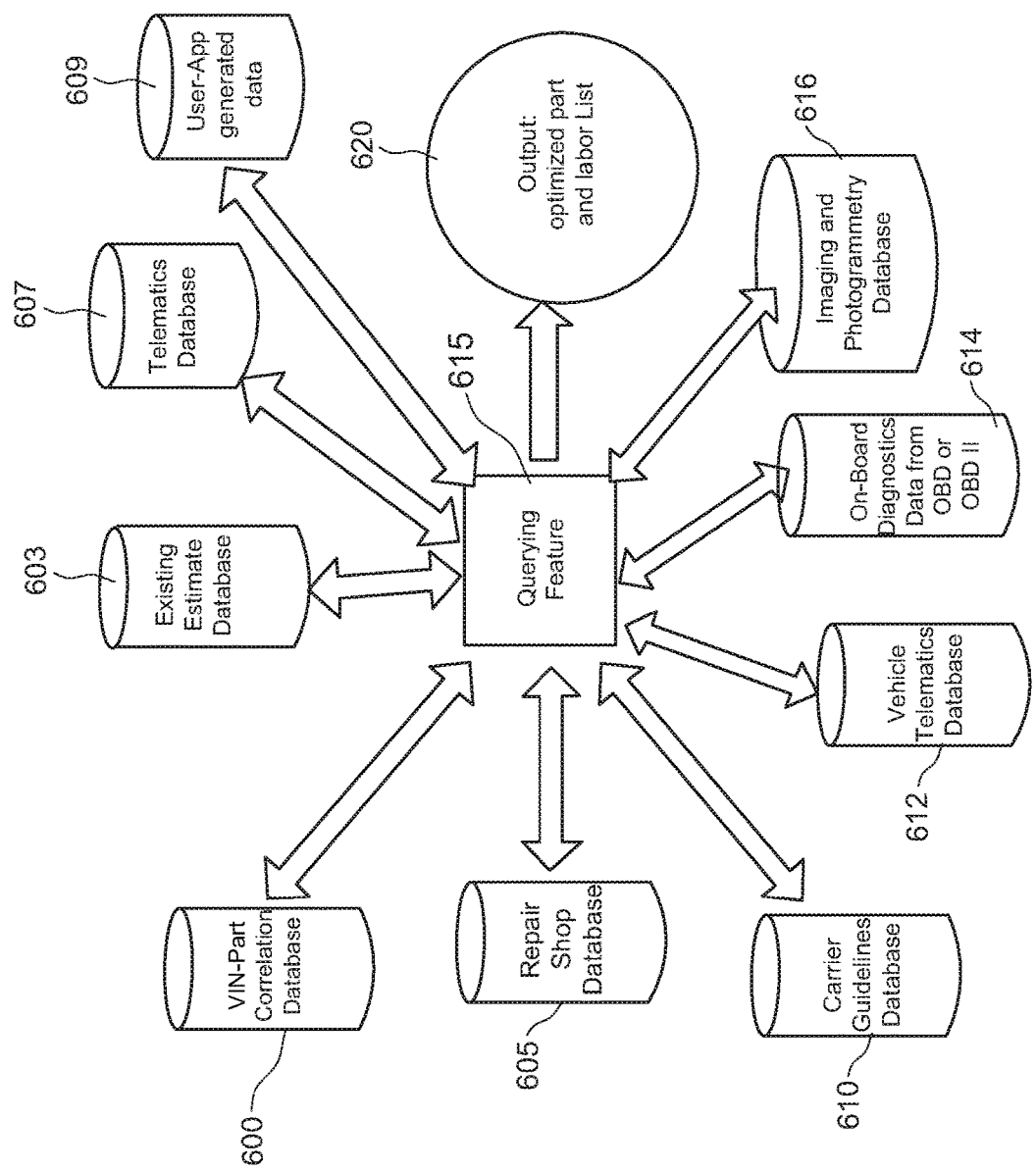
FIG. 6. Automatic background inputs via in real-time via various databases.

The user can also view the Guidelines Review page 2300 to determine the impact of adhering to any of the guidelines and their specific requirements 2315 in order to decide on whether or not to apply the parts specific 2305 or labor specific guidelines 2310 guidelines to the current estimate. More details in how the final parts-list 1300 is generated are depicted in FIG. 6.

For example, if a repair of a part takes three hours, an estimate written by a shop that charges $50 an hour would cost half as much as the same exact estimate for a shop that charges $100 an hour. Since the labor rate has a substantial impact on the total cost of the estimate, the present invention factors out and normalizes the labor rates and performs its initial calculations based on the labor hours only and without taking into consideration the different labor rates from prior estimates. Once these analyses have yielded results that most closely represent the current collision damage under assessment, the present invention applies the labor rates back to its calculations. Furthermore, it utilizes its procurement module, 113 to ascertain the available part-types and part-costs, as well as paint and other materials to produce a complete repair estimate. Taking out the variable factors that typically impact the outcome of a repair estimate enables the present invention to effectively compare a plurality of existing repair estimates in order to produce its results. This initial factoring out and later application of variables such as parts-costs and labor rates can be done in real-time and/or by presenting the user with an interface similar to FIG. 23. One embodiment of the present invention, allows these settings to be preconfigured in the system in order to carry out these processes in real-time as the user is providing its input to the present invention.

As stated, it is critical for this normalization to also be performed across various part-types and standardization of their part prices. In order to effectively compare all estimates with each other as well as with the estimate being produced for the current vehicle under assessment, the present invention compares all parts based on their standard pricing typically derived from OEM parts or calculated based on regional pricing, however this is not a requirement of the present invention. If in the future other parts become standard for a pricing model, the present invention can utilize those parts or utilize its own standards for part price comparison.

Once the comparison is performed and the cost of all the parts necessary are determined based on standard pricing and standard parts, the present invention invokes its parts-procurement module to obtain information on availability and pricing of other parts with different characteristics, such as higher quality, cost-effectiveness, faster availability, etc. These parts may be from other discounted OEM parts supplier, recycled parts suppliers, aftermarket parts supplier, remanufactured parts suppliers, etc. This allows the present invention to objectively determine the extent-of-damage and cost of the repair and then take into consideration the necessary adjustments based on the current labor rates and availability of parts, enabling the present invention to perform an accurate comparison regardless of labor rates and parts costs and availability and then include those factors in the final results.

The present invention takes into account all factors that impact the total cost of repair in order to effectively compare a given repair estimate to that of a plurality of similar estimates. Once this comparison is made based on the most pertinent elements of the repair, the present invention presents the user with options that determine the impact of applying these various guidelines back to the estimate 2300 FIG. 23. For example, once it is determined that a given repair requires 12 parts and 8 hours of labor to properly replace those parts, the present invention then presents the user with various additional options that can be adjusted, impacting each suggestion, such as: Adjustment of the Body, Refinish, Structural, Frame and Mechanical Labor rate of those repairs; Impact of using recycled assemblies on labor and part costs versus using individual part components; Requiring utilization of various part-types and the costs associated with those repairs; The cost of adherence to certain insurance company, repair facility, or state or local government requirements to repair a given vehicle, etc.

The final parts-list, whatever the composition, is initially based on and in reference to a standard parts-list 1620 typically of OEM parts. These OEM parts can be derived from a VIN-Part Correlation Database 600, or be compiled by taking a union of all the parts in the existing estimate database 603/120. As such, once the user enters the requisite information in the user interface 140 or 150, the processing module 105 queries various databases, namely the existing estimate database 120 and the Point-of-Impact POI to Universal Part ID UPID database 106 and an optional Imaging and Photogrammetry database 111 and/or utilizing Vehicle Templates 112/607 in order to generate the standard parts-list 1620. The present invention can further utilize User App-generated data 609 from the user's device that may contain various information such as travel speed, time of impact, velocity of the vehicle, etc. This process is encapsulated in 1605 which utilizes all the databases depicted in the cloud-based Predictive Analytics Engine 100.

Once the OEM parts-list is generated, the processing module 105 cross-references 1630 the OEM parts-lists 1620 with the rules and criteria available in the carrier guidelines database to determine the specific criteria for the given repair. For example, which parts can be obtained as non-OEM parts and which parts have to be OEM parts based on the carrier guidelines 110. Results of block 1630 are then checked in a checking operation 1635 against a set of parts selection criteria 1640 comprising specific attributes, criteria and limitations that parts within the final parts-list 1645 shall all adhere to. These attributes, criteria and limitations include, but are not limited to, parts availability, part-certification, state or local government criteria, maximum or minimum price, shipment distance, shipment costs, etc.

While the present invention is querying the total estimate cost and the necessary part and labor requirements, it is also checking its recommendations against various databases such as the total-loss valuation database 108, carrier guidelines database 110, vehicle templates database 112, Imaging, Photogrammetry and Lasergrammetry database 111, Vehicle Telematics Database 107, On-Board Diagnostics Database from vehicle OBD/OBD-II ports 109 to take additional input from these various sources.

Final result is a parts-list 1645 comprising subsets of OEM 1650, Aftermarket 1655, Recycled parts, Remanufactured parts and/or other types of parts, as well as the labor hours, and refinish and materials necessary to complete the repair.

While the present invention produces an accurate estimate using its predictive analytics engine, it also takes into consideration various guidelines and rules that can be applied to its result-set. For example, it evaluates the Carrier Guidelines database 110 to ensure that none of the selected parts are disallowed by the carrier that has insured the current vehicle. If such violation occurs, the present invention displays a warning 1705 on its main interface informing the user and guiding her to correct that violation. In another example of such analysis, the present invention takes into account guidelines that may have been setup by a Repair Shop that can optionally be assigned to perform the repair. If such a repair shop has rules defined within its profile that are violated based on the interactions with the present invention, other alerts and warnings will be displayed to the user 1710.

While the present invention produces its total cost of the repair, it constantly compares that total cost to its total-loss database in order to ensure that the total cost of repair does not exceed the total value of the vehicle by more than a certain threshold. For example, if the total cost of repair is within 80% of that specific vehicle's current value, a warning 1715 appears on the main interface of the present invention to let the user know that the overall cost of repair is getting close to the total-loss value of the vehicle. Another Alert that can be presented to the user is if the overall cost-effectiveness of the repair is below a certain threshold based on the cost-effectiveness-factor calculation module of the present invention. 1717.

The present invention includes an initial user interface 140, 150 connected to the existing estimate database 120. The connection may occur via the Internet or through any other means that one skilled in the art would use to connect these two modules together. The initial user interface 140, 150 must be displayed on some type of computer, smartphone, or tablet screen 135, 145 in order for the user to utilize the capabilities of the present invention. The initial user interface 400 includes a cost indicator 430 that shows the total cost of the estimate for a repair job, based on data-points either selected, or manually entered by the user.

There is also a Vehicle Identification Number VIN indicator 410 where the user can input the VIN or a vehicle year/make/model indicator 405 where the system automatically determines the year, make, model and other characteristics of the vehicle, based on decoding the VIN Number. Alternatively a VIN scanner or an integrated camera can be used to capture the VIN directly from the vehicle or anywhere else where it may be written.

Figure 4:
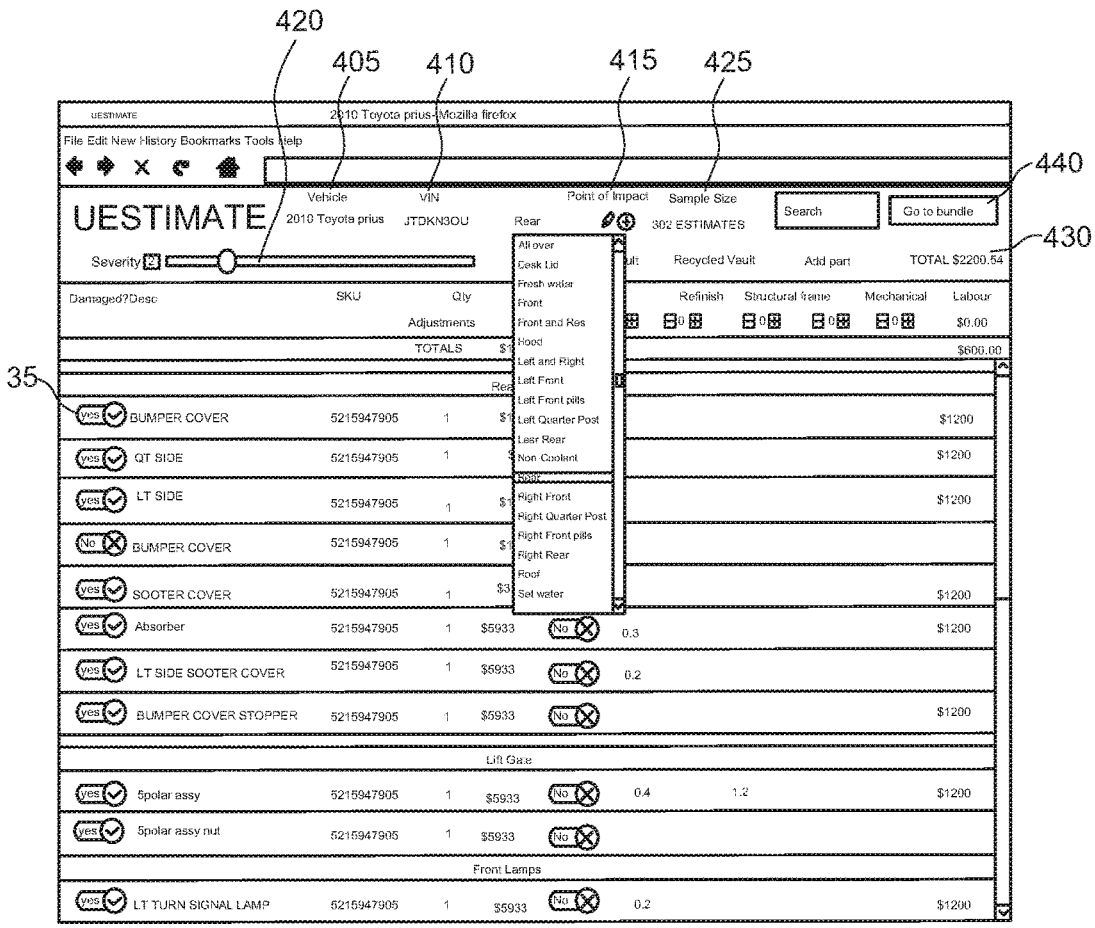
FIG. 4. User Interface Inputs for the user to enter vehicle and select the extent-of-damage indicator.

A point-of-impact indicator 415 where the user selects the region of the vehicle representing the point-of-impact 415 might include, but are not limited to Front, Right Front, Left Rear, Hood, Roof, etc. as depicted in FIG. 4. The present invention also includes a sample size output 425, which represents the total number of vehicles based on which the analysis was performed. The present invention includes a crash extent-of-damage indicator 420, which is a slider interface, which the user can use to change the extent-of-damage of the crash on a scale of 1 to 10, with 10 being highest.

In the present embodiments, the crash extent-of-damage indicator 420 is a slider, but the present invention is not limited to such design. After the user inputs or selects the data values from indicators 405, 410 and 415 and 420, the querying feature 210 of the present invention queries the existing estimate database 120 and returns a result for the number of estimates.

The present invention displays output pictures 700 of vehicles which have experienced collisions of the particular year, make, and model, and other necessary characteristics of the vehicle and point-of-impact of the damage which the user has entered into indicators 405, 410, and 415, which has incurred damage of the extent-of-damage level, which the user has provided through the crash extent-of-damage indicator 420. The present invention also displays a projected parts-list 1300 of the parts needed to repair the vehicle, which is updated in response to the changes in the crash extent-of-damage indicator 420 and which the user may alter by adding or removing parts. Each part is designated to be replaced or repaired by the present invention based on a plurality of analyses performed by the predictive model that determines whether the part should be repaired or replaced. Each part may also be designated by an SKU, or Part Number 1315, which is a unique number that is designated to parts of that specific type, for identification, sourcing and procurement purposes. In addition, the present invention includes indicators for Body repair labor cost 1000, Refinish labor cost 1005 Structural labor cost 1010, Frame labor cost 1015 and Mechanical labor costs 1020. These labor indicators enable the repairer of the vehicle to "request" additional hours for any of the given operations beyond what is suggested by the present invention, or "discount" some of the hours as suggested by the present invention on the overall estimate without changing specific values associated with each line item.

The cost indicator 1310 displays a cost estimate once the user has entered data in indicators 405, 410, 415 and 420. This can be altered further if the user selects the + or − interfaces of the indicators 1000, 1005, 1010, 1015 and 1020, to specify additional or fewer labor hours necessary for the repair, or if the user changes the information in the projected parts-list 1300 by change the flags 1320. The querying feature 210 of the present invention queries the existing estimate database 120 when the user changes any of these variables, and the cost indicator 1310 changes in response to the user changing any of indicators 405, 410, 415, 420, 1000, 1005, 1010, 1015 and 1020.

The present invention also allows the user to add any parts that may be necessary for the repair but may have not been included by the predictive analytics module of the present invention as seen in FIG. 5.

The present invention incorporates new data from multiple sources, to take long-term changes in the cost of a specific repair into account, and to alter new estimates based on these changes. The present invention quickly compiles data about the cost of new repairs from a single database through its predictive analytics engine to produce an accurate repair estimate that is much faster than human estimators, without compromising completeness or accuracy of each estimate.

The present invention, allows a novice estimator to enter a VIN belonging to the damaged vehicle that is under assessment and select the points-of-impacts that were damaged in a collision. Once the vehicle and points-of-impact are identified, the present invention will perform an in-depth analysis of its existing estimate database 120 and query all vehicles that have had similar points-of-impact. The resulting dataset produces a list of all vehicles with similar year, make, model and other vehicle characteristics and similar points-of-impact to the vehicle under assessment.

Furthermore, the present invention allows the user to specify a paint-only extent-of-damage indicating that the damage is of the most superficial nature and involves repainting of the part without any damage to the plastic or metal material beneath the paint.

One embodiment of the present invention performs its analysis using a Bayesian probability model to determine which parts are likely to be damaged, based on the damage incurred by similar vehicles which have had collisions at the same points-of-impact to the vehicle under assessment. Bayesian modeling is an effective technique for this task because our analysis has proven that when certain vehicle parts are damaged, the likelihood that other parts in the same area of the vehicle or with direct correlation to the damaged parts are damaged will increase dramatically. These probabilistic relationships are accounted for, by the present invention, when the querying feature 210 queries the existing estimate database 120/225 and returns results of estimates that are most similar to the year, make, and model, and point-of-impact, of the collision of the vehicle under consideration.

The large numbers of estimates and images that can be stored within the existing estimate database 120 allow the present invention to account for such probabilistic relationships with relation to vehicles of a specific make, model, and year, by using Bayesian techniques. The Querying feature produces all repair operations, necessary paint, refinish labor, repair parts and images associated with those previous repairs. For vehicles with multiple points-of-impact, the process is repeated for the additional points-of-impact in order to obtain a complete list of parts and labor hours and paint & materials necessary to perform the repair.

The point-of-impact indicator of the present invention is accompanied by an extent-of-damage slider that ranges between 0 to 10, where 0 indicates no damage, 1 indicates slight damage, 2 indicates small damage, 3 indicates medium damage, all the way to extent-of-damage 10 which indicates the most severe extent-of-damage to that point-of-impact. Note that the upper limit of the extent-of-damage indicator can be changed to a higher number in other embodiments of the present invention. If the user sets the extent-of-damage indicator to 1, the present invention, will ask the user if this is a paint-only damage, the response to which will direct the present to distinguish between a paint-only damage which is indicated by an extent-of-damage of between 0 and less than 1.

Figure 22:
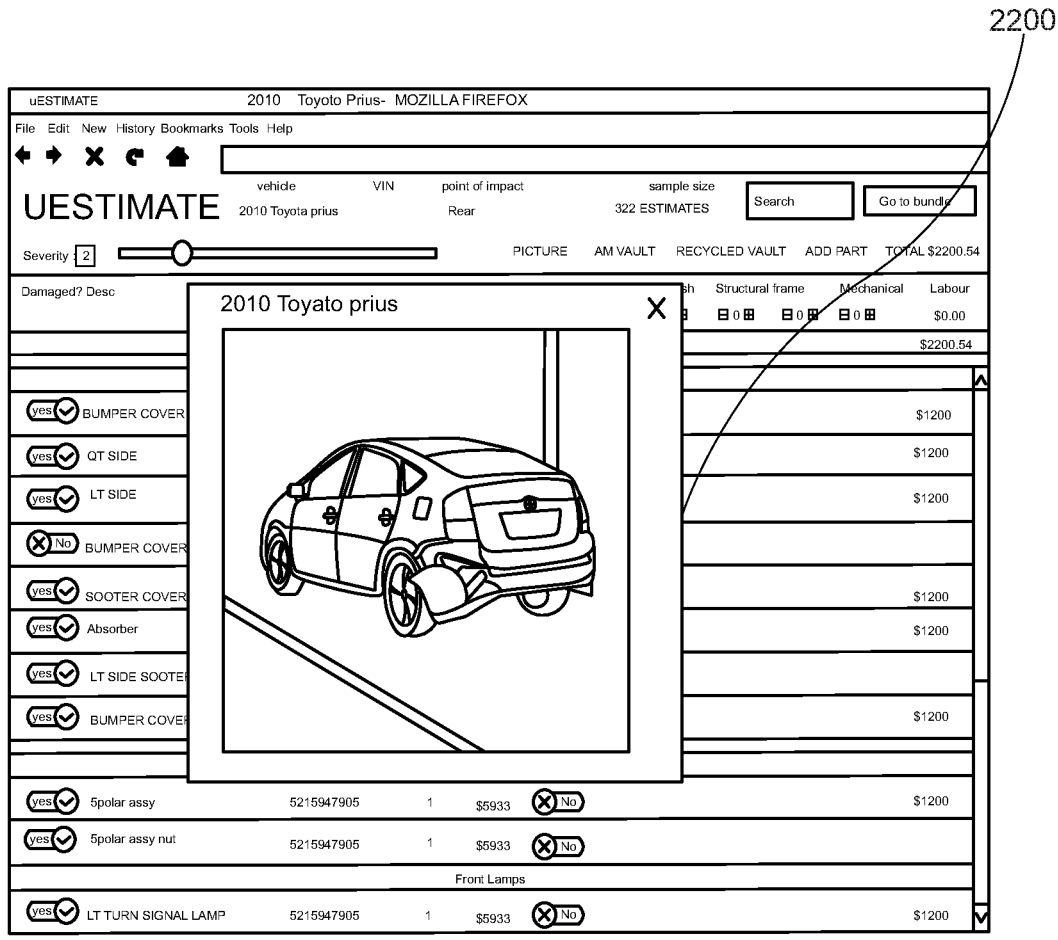
FIG. 22. Image of a vehicle with similar damage is displayed as the slider is moved.

As the user moves the slider from left to right, images of vehicles with similar damage appear on the estimating interface as shown in FIG. 22 providing a guide for the user to select the correct damage level for the extent-of-damage that was incurred by the vehicle under assessment. Once the user releases the slider, the present invention automatically selects the extent-of-damage level of the range of damages and a picture that best represents the extent-of-damage incurred by the vehicle being assessed. A full list of all parts, refinish material and repair operations that are most suited for the current vehicle's damage, repair operations, paint costs and parts-list appears under the slider for the given point-of-impact or points-of-impact and extent-of-damage levels.

The user is also able to click on the "Picture" button 1030 to display the extent-of-damage selector based on a visual extent-of-damage selector interface As shown in FIG. 7—705. This encapsulates another embodiment of the present invention that allows selection of the extent-of-damage level through use of multiple images each pertaining to a particular extent-of-damage for the vehicle under assessment. This allows the user to compare the displayed images with the vehicle being assessed for damage and click on the image of the damage level that most closely resembles the damage of the vehicle under assessment as shown in FIG. 7. The present invention will then display a list of all parts, refinish, and labor operations and all other data points pertaining to the repair of the collision of the vehicle under assessment, as well as the total estimated cost of the repair.

Another embodiment of the present invention utilizes a secondary and more granular damage indicator that allows the user to select extent-of-damage levels that are between two integer numbers presented by the crash extent-of-damage indicator 420 by clicking on and dragging down the slider button, in which case a new granular crash extent-of-damage level slider appears on the screen 1100 as seen on FIG. 11. In the example in FIG. 11, the lower limit is at 0 1105 and the upper limit is at 1 1110 essentially expanding the scale of extent-of-damage levels between two integers to the entire screen. The user can move the granular slider button 1115 to any desired value in which case, the projected parts-list 1300 and all other pertinent data points will be updated in real-time based on the value of extent-of-damage indicator 420 value and the value of the granular extent-of-damage indicator 1125. This granular slider provides additional control to the user than the 10-step slider that breaks down the extent-of-damage to 10 distinct levels. Granular extent-of-damage indicators below integer 1, represent a paint-only job that can be repaired without any parts and entails either a repaint of that part, or some wet-sanding and polishing of the part.

Utilizing the granular damage indicator allows the user to add/remove parts, refinish and labor operations that pertain to a given level of damage and/or specific area of the vehicle without the need to go to the next or previous damage levels. This is analogous to allowing the estimator to use the secondary damage indicator to move the slider in decimal points such as 3.4 to 3.5, etc., therefore making smaller changes than the top level slider.

Another embodiment of the present invention, presents the user with a paint-damage indicator that allows the user to specify whether the paint on each damaged panel is not damaged, is damaged and can be repaired through web-sanding and polish, or whether the entire panel needs to be painted. This helps determine the amount of paint, refinish and clear-coat labor necessary to repair the panel. The Artificial Intelligence component 215 of the present invention keeps track of the correlation between these numbers of various severity levels stored in the estimate database and accumulates their values in the form of a vector, thus improving its performance as this components learns the correlations between these values.

In another embodiment, the present invention utilizes an image recognition module 810 that can compare a plurality of images from a database of images of existing collisions to that of an image or images of the vehicle under assessment in order to provide an estimate of the damage for the vehicle that is currently under assessment as shown in FIG. 8. Furthermore, the present invention provides a smart-phone app, or a tablet application that guides the user on how to properly take a set of pictures that can best be utilized for performing such a comparison. Based on that comparison the level of severity and extent-of-damage are determined. However, the suggested level of severity and extent-of-damage can always be overwritten by the user.

In another embodiment, the present invention provides the ability to collect additional information to enhance its results by taking into consideration the impact of answers to a set of predefined questions. The user is presented with a number of specific questions 325 that will help to better determine the extent-of-damage and other characteristics of the collision and the resulting damage to the vehicle. Some of these questions include, but are not limited to: Are there any fluids or leakage from the car?; Is the vehicle drivable?; Which airbags bags were deployed, if any? Has the collision impacted the way the car handles or drives?; Did the vehicle roll-over at the time of the collision?; Was your vehicle drivable after the accident? Was it towed? What was the approximate speed of your vehicle at the time of the collision?; What was the approximate speed of other vehicles, if any, at the time of the collision?; Were there multiple points of impact?; Did the vehicle crash with any other objects or structures?; How many different glass areas such as windows, windshields, etc. break at the time of the collision?; Was there any bodily injury?; and Did any parts fall off the car after the collision?

Based on the answers to the questions above, and the weights and costs that are assigned to each question, the present invention calculates the impact of answers to the above and other questions and modifies its results to represent the impact of each answer.

Furthermore, a layering mechanism assigns layer-numbers as metadata to each vehicle part where the number 1 corresponds to the outermost layer shell/paint of the vehicle and the number 1000 corresponds to the innermost parts of the vehicle. This allows the present invention to effectively determine what parts are damaged as it evaluates the direction of the impact from the outer-most layer to the inner most-layer. For example, if parts with a layer number of 1 and parts with a layer number of 25 are damaged in the same area of a vehicle, there's a higher likelihood that parts with layer numbers of 2 to 24 in the same area of the vehicle are also damaged as long as they are within the direction of impact.

In another embedment of the present invention, the system evaluates an estimate against the layers of damage in order to more accurately determine the extent-of-damage. In other words, if a collision has only layer 1 parts that are damaged, then it must be a superficial collision, presence of layer 1 and layer 2 parts indicates a more serious damage, all the way to the inner-most parts of the damage that would ultimately indicate that a vehicle is likely a total-loss. During the analysis of prior repair estimates, the present invention evaluates each part and assigns layer numbers to them. The predictive model of the present invention then analyzes thousands of prior accidents, their specified parts and associated images of those collisions to assign layer numbers and multiple values in a form of vectors that are utilized by the predictive model to determine which parts are damaged and to what extent.

The present invention enables each repair facility and insurance carrier to create a profile within the configuration setting of the system. The combination of the shop's profile and that of the profile of the carrier underwriting the repair, result in the present invention producing an estimate that is more heavily geared toward repair of the damaged parts on the vehicle or geared more toward replacement of those damaged parts, depending on the combined preferences of the shop and the insurance carrier underwriting the repair.

The predictive analytics engine of the present invention produces a list of all damaged parts, with suggestions as to which parts should be repaired or replaced on a part-by-part basis. These suggestions are derived from historical data of prior collisions, as well as artificial intelligence module of the present invention that evaluates all pertinent information in order to make repair versus replace suggestions.

The present invention initially produces an estimate that represents the ceiling of the total cost of repair for a given point-of-impact and extent-of-damage level, allowing the estimator performing the damage assessment to make the necessary adjustments to either reduce the total cost of repair or increase it based on the need for additional parts, refinish or labor operations that may have been missed or over-suggested by the present invention. Furthermore the estimators can made changes to add ore remove labor hours necessary that the present invention may have missed or overestimated. These can also result from the estimator's decision to make the necessary changes to repair certain parts instead of replacing them or vice versa.

In addition to the manual adjustment of these operations, the artificial intelligence module of the present invention evaluates prior estimate and data vectors and images in order to intelligently suggest the proper operation on each line-item. It further takes into consideration and accumulates the manual adjustments as they are made by various estimators in order to adjust its future results based on continuous feedback of these adjustments for specific vehicles and points-of-impact and extent-of-damage.

Each line item on the roster of parts produced by the present invention has a yes/no button 435 as shown in FIG. 4 that indicates whether or not a part is damaged. By default all parts selected for a given point-of-impact and extent-of-damage are selected as damaged. However, if the user determines that certain parts are undamaged, she can click on the damage indicator button to turn off that part and therefore remove it from the results and total calculations of the present invention's results. These actions are all logged by the present invention, enabling it to accumulate these data-points from users and reflect them in future results set. Furthermore, the skill-level and accuracy of each user is noted and kept track of in the present invention, enabling it to rank and weight each user's input to be more or less important in consideration for its future calculations.

The present invention has a configuration mechanism to calculate the ratio of total cost of repair for a given part to that of its replacement cost. For example, some insurance companies will not agree for the part to be repaired if the cost of repair is more than a certain percentage of the cost to replace that same part. Therefore the default "repair" labor on a given part is automatically set to be below the predefined percentage of the total cost of procuring and replacing that part, as specified by the insurance company or the repair shop. This parameter is configurable within the present invention and is used to calculate the repair calculations of parts that are changed from the replace operation to the repair operation 1025.

If the estimator decides to repair a given damaged part, as opposed to replacing it, there's a yes/no button 1025 indicating whether or not the part will be repaired as shown in FIG. 10. Checking the repair indicator button, changes the operation of a given part from "replace" to "repair", and automatically calculates a default value of the total number of labor hours necessary for a given repair. In addition to repair hours, there are several other indicators that automatically calculate the necessary refinish hour, mechanical repair hours, structural repair hours, frame repair hours, aluminum repair hours, and miscellaneous repair hours.

The estimator has the option to evaluate the total value of these repair hours and make adjustments by either adding and/or subtracting the total repair hours from each section, using the interfaces 1000 through 1020 in FIG. 10.

For additional points of impact, the user of the present invention can simply add a new point-of-impact 415, using the Plus sign on the main User Interface FIG. 4, and go through the same process as the first point-of-impact again. The present invention will effectively combine all the necessary parts and repair procedures from all points-of-impact and in real-time calculate the necessary refinish, structural, mechanical, frame, etc. hours and materials, in order to produce a simple and accurate estimate for the given collision damage.

There are two different methods to collect and aggregate the data necessary to operate the present invention.

The present invention relies on a plurality of final estimates and their images previously produced by various estimating systems in order to compile and categorize the necessary data to produce a fast and accurate estimate for a given vehicle's repair by point-of-impact and extent-of-damage. The predictive modeling of this data produces a comprehensive repair estimate that can then be easily modified prior to being finalized.

Another embodiment of the present invention creates and takes advantage of a database of repair estimates that utilize a number of "staged" and simulated estimates created to represent various extent-of-damage levels and present the damaged parts, paint and necessary labor operations from the outermost layer to the innermost layer of the vehicle, in essence mimicking a real-world estimating process. This embodiment of the present invention is most suitable for newer vehicles that may not have sufficient estimate data available to reliably produce a repair estimate for a given vehicle with certain extent-of-damage level on a given point-of-impact.

As discussed, the user of the present invention always has the option to remove any part that may not have been damaged in the current collision, but is specified as damaged by the present invention. Conversely, the user also has the option to select additional parts as shown in FIG. 5 that may have been missed based on the point-of-impact and extent-of-damage indicator of the present invention. In these cases, the present invention allows the user to make the necessary adjustments prior to finalizing the repair estimate.

The idea behind the present invention is that if 1,000 vehicles with the same base-VIN essentially the same year, make, model and other characteristics, the same point or points-of-impact and extent-of-damage cost $1,250 to repair, then vehicle number 1,001 should also cost $1,250 to repair, given that all the necessary parts can be reliably and cost-effectively acquired for the repair, and if the labor rates charged to repair the vehicle are standardized. Furthermore, if because of various reasons, cost of parts necessary for a given repair, or labor rates of the repair facility performing the repair is higher, the cost of the repair estimate will be higher based on the additional labor and part costs. However, factoring out those variables, as well as other miscellaneous variable costs such as towing, storage, etc., the cost to repair the 1,001st vehicle should be substantially similar to the cost of the repair for the first 1,000 vehicles.

This is because the costs of repair parts are typically the biggest contributor to the variance in the cost of repair. The reason that estimates written at different shops by different estimators typically have such a high variance of cost, is that there are four different types of repair parts, namely OEM, Original Equipment Manufacturer, Aftermarket, lower-cost alternatives to OEM parts, recycled parts and remanufactured parts that have been recovered and/or reconditioned by recycling facilities for the purpose of reuse in a collision repair.

One of the reasons that the present invention can reliably produce a collision repair estimate is that it effectively factors out the biggest variable contributor to the cost of the collision repair: replacement parts. This is done through a sophisticated parts procurement module 205/113 of the present invention that reliably locates, prices and procures the most accurate and cost-effective set of parts necessary for a given repair based on their proximity to the location of the repair or the presumed location of the repair, taking into account all part-types, their cost, availability, and the correct part, specific to the options of the vehicle under assessment.

The cost effectiveness module of the present invention utilizes a system and method for measuring and scoring cost-effectiveness of a part based on comparison of that part with the same part or that of substantially similar parts but of different part types. This method accurately determines which available parts are cost-effective and therefore should be utilized for a given repair.

In addition to the cost-effectiveness of each part, other factors besides cost of the part can also be analyzed and taken into consideration. These factors include, but are not limited to, shipping cost of the part to its intended destination, time of shipment, time to delivery, distance between the part vendor and repair shop, quality of the part, reputation of the part vendor, and performance score of the supplier based on analysis of its prior orders with the current supplier or the entire market.

These factors have a direct impact on the cost-effectiveness parts and the entire estimate. For example, when comparing two parts, one costing $100 and the other costing $120, it might be significant if the $100 part is 3 days away, but the $120 part can be obtained the next day. It may be more cost-effective to purchase the $120 part versus the $100 part, in this situation, since the time to repair the vehicle will be longer if the $100 part is used, or the cost to obtain the $100 part sooner is much higher than obtaining the $120 part. Therefore, the repair may cost more, if rental car fees and/or shipping fees, the time necessary to store the vehicle, and the lost time for the consumer are taken into consideration The quality of a part is also relevant to its cost-effectiveness. If the $100 part in the example above is of lower quality, the repairer may take much more time to adjust and fit the part onto the vehicle, as opposed to the $125, part, which might fit the first time without the need to make any adjustment or additional fitment work.

Factors including shipping cost of the part to its intended destination, time of shipment, distance between the part vendor and repair shop, quality of the part, and reputation of the part vendor, and procurement scores and feedback can be assigned various weights by the present invention in order to properly compare these options. These factors can take into consideration the labor rates, cost of rental, etc. that may pertain to the specific vehicle under assessment.

Another embodiment of the present invention employs a link on each part section that provides a visual depiction of the pertinent section of the part manufacturer's electronic parts catalog or EPC As shown in FIG. 18. This interface contains a visual depiction of all the parts that are included in a given section, and highlights the parts that have been added to the repair estimate with a different color blue in this case. These parts could have been added to the parts-list either through the predictive analytics processes of the present invention or manually by the user. The user has the option to add or remove any parts that she may deem necessary by reviewing them against the diagram images of those parts in the visual interface. A "previous" link and a "next" link, within the parts-list, allow the user to navigate through the previous and next sections of the vehicle under assessment to locate and identify any available additional parts based on their proximity to the location of the repair, that may need to be manually added to or removed from the parts-list of the repair estimate.

The present invention also contains a module that provides the user with an integrated Manufacturer Recommended Repair Procedures for each section of the vehicle as show in FIG. 19. These Repair Procedures can be discoverable from each manufacturer's website and web-services portal in order to make their discovery and presentation more effective. A view link/button on each section of the vehicle displays the integrated Manufacturer Recommended Repair Procedures for that section and presents them to the user to ensure adherence to these procedures and guidelines 1900. There is also a "previous" and a "next" link, allowing the user to navigate through the previous and/or next sections of the vehicle to display any additional Manufacturer Recommended Repair Procedures that may be necessary for the proper repair of the given vehicle. As shown in FIG. 19.

When any time a part repair or replace procedure is selected either manually or through the predictive analytics module of the present invention the integrated Manufacturer Recommended Repair Procedures are automatically presented to the user in order to ensure that these procedures are followed.

The present invention also keeps track of the number of times these integrated Manufacturer Recommended Repair Procedures are actually accessed and therefore likely followed by the user. This is done by logging and time-stamping the user's access to these procedures. The present invention stores this access information in a copy of the current repair estimate, so that it can be presented as evidence that the repairer has accessed and likely followed the Manufacturer Recommended Repair Procedures. This may help the user demonstrate their access and therefore following of the repair procedure in the future.

When determining the severity of a given repair based on the dollar value that it costs to repair and the cost of the parts, the Present invention normalizes the cost of the proposed repair by standardizing the hourly labor costs retrieved from the existing estimate database 120. This is done so that a historical estimate with an hourly labor rate of $70 per hour does not seem to be more severe than the exact same estimate with a labor hour rate of $40 per hour.

A similar procedure is done regarding the cost of parts for a given repair. If a given repair was done with the same exact parts as another repair, but the exact part for 'estimate A' happened to cost more than the same exact part based on part-type and quality for "estimate B," then, in creation of its estimate of labor and parts, the present invention will assume all part types and part costs to be a standard cost and part-type, in order to normalize the severity of the repair by factoring out the variations of labor hour rates and costs and part costs. Once this normalization takes place, the present invention then compares the severity of all repairs in order to rank them between the high and low end of the severity range.

In cases where historical repair estimates are done with different part-types, for example, with recycled parts, versus OEM parts, one embodiment of the present invention compares the labor hours and part-costs of similar part-types against those of their alternative parts. For example, if the historical estimate data contains a door assembly, with modules that include a door-shell, regulator, inner-panel, handle and mirror, plus 4 hours of labor to install and paint the door, the present invention compares the cost of the recycled parts assembly with that of all the OEM modules and their associated labor hours, in order to produce a valid comparison. Once again, the cost of the recycled door assembly is normalized in order to compare effectively to that of other door assemblies with similar quality and grading.

The present invention also employs a calculation method that utilizes a fraction of the labor hours and part costs associated with replacing an existing part in order to suggest the labor hours that can be charged to repair a given part.

This calculation method takes into account the historical distribution of labor hours across different repair types, e.g. body, refinish, frame, structural, mechanical, etc. for a given part in order to distribute the labor hours properly for the current repair under assessment.

For example, if replacement of a given part requires 7 hours of refinish time, the system uses the same number of hours i.e. 7 hours of refinish time as the cost to paint the part being repaired based on the logic that the number of refinish hours of a part should be the same, whether that part is a brand new part being painted or one that was repaired and needs to be painted after the repair.

Another embodiment of the present invention performs analysis of multiple labor types such as structural and frame to install a new part, to make a determination on how many labor hours should be allowed when the estimator decides to repair the part instead of replacing the part with a new OEM part.

Once the total number of additional hours have been determined, the present invention applies those additional hours to each individual labor type in order to have a concrete estimate, at the same ratio that the hours are applied to the part as if the part was to be replaced instead of repaired.

In another embodiment of the present invention, the proper selection of the option-specific parts are aided by a VIN database 115 that accurately correlates all part variances of a given vehicle to the VIN associated with the vehicle that is being assessed for damage. The VIN database allows selection of the correct part for a given vehicle by correctly identifying which of the possible parts with various differences are the correct parts for the repair. For example, a 2011 Chevy Malibu may have 3 different kinds of side-view mirrors: A non-heated side-view mirror with blinkers—part# SVM123; A side-view mirror with a heated mirror—part #: SVK999; and A side-view mirror without a heated mirror—SVG300

The VIN database enables the present invention to identify the correct mirror to be procured to replace the damaged mirror of the vehicle for which an estimate is being produced.

When there are several variations of the same part, the present invention indicates availability of alternative parts as shown in FIG. 12 by presenting an alternative parts icon 1205 and allowing selection of a specific part from an Alternative Parts-list 1200 from which the user may select the desired part. Once the selection has been made, the projected parts-list 1300 will be updated with the selected alternative part and all required pricing and other information on the parts-list will reflect the change in real-time.

Furthermore, the present invention can rely on the feedback from its procurement module 205/113 as to the pricing and availability of the correct parts necessary for the repair. One reason that the present invention can effectively produce an accurate estimate lies in its ability to obtain this information from its parts-procurement module to accurately and effectively identify, source, price and procure all the parts necessary for the given repair by sourcing the necessary parts from the available suppliers. This information can be conveyed to the present invention in real-time or in a delayed fashion depending on the part-procurement module and type of suppliers that are used and their integration level in the procurement process.

Once the variance of different repair part-types, their availability and pricing is removed from the cost of a given repair, the present invention can objectively and with a high degree of accuracy determine the total cost of repair for a given collision damage. This is done in part by relying on a parts procurement module to determine the correct set of parts, their availability and total cost. The present invention then analyzes the existing repair process data to determine the labor hours necessary for the repair. The combination of suggestions from these two modules results in a complete, effective and accurate repair estimate.

The present invention also includes a number of spinner objects FIG. 10 that allow overall, non-specific, adjustments to each labor-type, such as body, refinish, structural, frame, mechanical, aluminum and miscellaneous. These spinner objects allow the totals to be adjusted at the estimate level based on the user's judgment as opposed to detailed manipulation of each line item as is the case with the existing estimating systems. The biggest advantage of the present invention lies in its ability to allow estimators to get out of the minutiae of every small rivet, clip, and fastener necessary for the repair or every small repair step and procedure. Instead it produces an estimate based on predictive analytics of a plurality of existing records and images for similar estimates, therefore freeing the estimators, adjusters and insurance carriers to attend to more important functions necessary for the repair process. The simplicity and efficacy of the present invention makes it even suitable for non-professionals such as vehicle owners who may have been involved in a collision to generate estimates for the repair of collision that they may have incurred.

One embodiment of the present invention contains an "artificial intelligence" module with the capacity to "learn" by accumulating detailed information on all actions and analysis, the system suggestions and user-interactions as they are carried out for each vehicle. As estimates for certain repairs on a certain types of vehicles are generated by the present invention, these estimates and all of their specific information and user interactions such as adjustments to damaged parts, repair versus replace of certain parts, adjustment to labor hours, etc. will be added to the artificial intelligence database.

The present invention takes this information into account when making future estimates for repairs on the same types of vehicles. In this embodiment, the present invention accumulates additional data on these data points and utilizes them in generation of complete repair estimates in the future. This is partially done through correlation of all characteristics of the collision with that of the parts, refinish and labor operations necessary to complete such a repair. For example, one of the questions in 325 is "Are there any fluids or leakage from the car?" If the answer to this question is yes, for a right-front collision to a certain vehicle and the present invention identifies that the leakage is from the "brake fluid reservoir" which is located on the right-front side of the vehicle, the present invention can then determine that the "brake fluid reservoir" gets damaged in right-front collisions of that specific vehicle with extent-of-damage above a given level. This self-updating and self-learning aspect of the present invention enables it to constantly learn from its past operations in order to improve its future suggestions.

In another embodiment of the present invention, the system ranks the cost-effectiveness of parts and labor rates of each estimate, using a measurement that enables easy comparison of such variables. In order to compare the cost-effectiveness of parts utilized for the present invention, the system generates and keeps track of a Cost-Effectiveness-Factor CEF which is calculated as follows:

$$CEF = \frac{Part_{Ref}(i) - Part_{Current}}{Part_{Ref}} \times 100\%$$

$$CEF(q) = \frac{\sum_{i=1}^{q}(Part_{Ref}(i) - Part_{Current}(i))}{\sum_{i=1}^{q} Part_{Ref}(i)} \times 100\%$$

In the above formulae PartCurrent is the price of the current part for which CEF is being calculated, PartRef is the price of the reference part, typically a standard part, which is often an OEM part, corresponding to PartCurrent. CEF is the Cost-Effectiveness-Factor of the current part and CEFq is the Cost-Effectiveness-Factor of a plurality of parts over a range of q parts, typically representing the total number of parts in the repair estimate. The above formula produces a number between 100% and a large negative percentage number. A CEF of 100% means that the current part's price is 0, and therefore the cost-effectiveness-factor of the part is 100%.

If the price of the current part is equal to the price of the reference part, then the cost effectiveness factor is 0, indicating that the part was purchased at the same price as the reference price. However, as the cost of the current part goes above the price of the reference part, the CEF value becomes negative to indicate a low cost effectiveness. The lower the value of the CEF, the lower the cost-effectiveness of the current part. When the present invention determines that the cost-effectiveness of the parts on a given estimate are below a certain threshold defined in the carrier's guidelines or other guidelines, the system generates an alert 1717 to warn the user to such thresholds having passed. Please As shown in FIG. 17.

Another embodiment of the present invention has a Review Guidelines interface 2300 that allows the user to easily evaluate the impact of the cost of various guidelines on the overall cost of repair. These guidelines are provided in the current estimate in a form of window that allows the user to manipulate these requirements in order to see their impact on the overall estimates. Some of these requirements are availability of various part-types 2305 such as aftermarket, recycled, discounted OEM parts, etc. for the given estimate. Impact of specific requirements on selection of those guidelines such as what minimum grades they must have, whether or not they should have certain certifications 2315. Impact of changes to various labor rates and number of hours on the overall cost of those labor rates, which ultimately impact the cost of the repair. The shop or an individual using the present invention can easily manipulate the settings for these guidelines in order to review and apply them to the current estimate. Application of these guidelines can reduce or in some cases increase the overall cost of the estimate from the one currently suggested by the present invention. As shown in FIG. 23.

In another embodiment of the present invention, the system receives estimates from various insurance companies or estimating companies in an electronic form and evaluates it with its predictive analytics engine in order to determine whether the estimate created by a third party is accurate, overpriced or underpriced. This analysis is performed as if a new estimate was being created by the present invention. However instead of creation of a new estimate, the present invention takes an existing estimate in the form of an input and produces the results as its output, in essence evaluating that estimate and comparing it to various characteristics of its predictive analytics engine in order to present the user with its assessment of the estimate provided electronically and present how it may differ from what the present invention would have produced.

One embodiment of the present invention, meant for endorsement by insurance carriers, utilizes its parts procurement module and order management module for all transactions that take place between a repair facility and all of its suppliers. This ensures that all necessary parts for a given repair are procured and that all unnecessary parts that may have been procured for a given repair are returned through the system. This ensures that the present invention will always be aware of all the necessary parts and their prices for a given repair. Once this is taken into account, the main variable in determining the accurate cost of the repair becomes determination of an accurate total labor hours necessary for the repair, labor rates for each repair operation and which parts should be repaired versus replaced. Note that this embodiment allows for supplemental part suggestions to be made after the fact as is currently the case, allowing parts that may have been missed to be procured at a later time, as long as procured through the procurement module of the present invention, and parts that were incorrectly procured to be returned through the same procurement module and credit for those parts to be returned to the entity paying the cost of the repair.

The predictive analytics module of the present invention, utilizes an estimate input, along with Points-of-Impact, Extent-of-Damage and/or Collision images, 2405 to evaluate whether or not sufficient data-points are available, 2415 for it to perform its analysis. If existing data-points are insufficient, it performs image analysis based on Photogrammetry, Lasergrammetry and pattern recognition, 2410 to obtain additional information. It once again, evaluates the data-points gathered from the image analysis module to determine if sufficient data-points have been gathered, 2425. If the present data-points are still insufficient the present invention then asks the user and/or an administrator for additional input, 2420. If data-points gathered from these additional steps are still insufficient, the present invention, generates a message that "An accurate estimate cannot be generated at this time for this vehicle," 2445, and terminates.

However, if there are sufficient data-points available (2415, 2425 or 2430) the present invention then creates a set of weighed vectors from such data-points. These vectors are created to be appropriate for each predictive model, 2435 being utilized by the present invention which then utilizes the generated vectors in appropriate predictive models to determine similarity or dissimilarity of parts, vehicles, schemata, or repair-vs-replace strategies necessary to produce a final repair estimate, 2465. Prior to producing a final repair estimate, it also checks to see if a similarity threshold has not been reached, it determines that an accurate estimate cannot be generated at this time for the vehicle, 2445, resulting in generation of a warning message to that effect and termination of the method. However, if a similarity threshold is reached, 2450, the present invention, checks for availability of an accurate part inventory and pricing 2460, if such availability is not fully satisfied, the present invention, adds a warning to its produced estimate that: "Exact estimate value and part pricing subject to availability.", 2455. The present invention then produces a complete repair estimate including: list of parts, refinish and labor hours, 2465 and terminates the method 2470.

In another embodiment of the present invention, one or more predictive models output a "prior probability" that each part is damaged. Let us denote these probabilities by $p\_i$, where i is the index of the n-th model.

For example, linear regression takes as input a vector of numbers, and outputs another vector of numbers according to the following formula:

$$y = m*x + b$$

In linear regression, the vectors m and b are calculated by a computer to minimize the sum of squared residuals, which is given by the following formula:

$$\sum_{i=1}^{m} (y_i - x_i)^2$$

Where x is the true value and y is the prediction. The output vectors $y\_i$ may then be transformed by a mathematical function to ensure consistency across models. For example, we may multiply each $y\_i$ by a vector $c\_i$ as follows:

$$c_i * y_i$$

Methods utilized to determine these prior probabilities $p\_i$ include linear regression as outlined above, and may also include, but are not limited to: Bayesian techniques and/or networks, nearest-neighbors methods, k-means, support vector machines, hidden Markov models, decision tree methods such as random forests and/or extremely randomized trees, regression, neural networks, binary classifiers, multi-class classifiers, linear classifiers, quadratic classifiers, kernel estimation, connectivity-based clustering, hierarchical clustering, centroid-based clustering, distribution-based clustering, density-based clustering, partitioning algorithms, as well as variants of each of these methods.

Once the probability estimates $p\_i$ are calculated, the $p\_i$ are combined into a net probability estimate, $q\_p$. This probability $q\_p$ is the net probability that a certain part is damaged or destroyed. A computer calculates the quantity $q\_p$ via the following sum:

$$q\_p = \sum_{i=1}^{n} (w\_i * p\_i)$$

In this formula, $w\_i$ is the numerical weight corresponding to the i-th predictive model. For example, logistic regression may be used to calculate $w\_i$ as follows.

First, the vectors $p\_i$ are transformed by the logit transformation, which has the following definition:

We first define $F(x)$ as follows:

$$F(x) = \frac{1}{1 + e^{-(B_0 + B_1 * x)}}$$

We then define the logit transformation as $$\ln\left(\frac{F(x)}{1-F(x)}\right)$$

As in linear regression, the numbers B_0 and B_1 are calculated by computer so that they minimize the sum of squared residuals, which is defined here:

$$\sum_{i=1}^{m}(y_i - x_i)^2$$

Methods utilized to determine the net probability include logistic regression as outlined above, and may also include, but are not limited to Bayesian techniques and/or networks, nearest-neighbors methods, k-means, support vector machines, hidden Markov models, decision tree methods such as random forests and/or extremely randomized trees, regression, neural networks, and variants of these methods.

For a threshold t, each part in a given vehicle is labeled "damaged or destroyed" if $$q_p > \tau$$

and "not damaged or destroyed" otherwise. For those parts labeled "damaged or destroyed", the method proceeds to estimate the degree of damage as follows.

For a part so labeled "damaged or destroyed", the computer calculates the similarity of this vehicle's damage profile to historical damage profiles, as above. This similarity is a vector, which we denote by s_j.

Given a damage profile and corresponding set of similarities to historical damage profiles, the method classifies each part as either "damaged" or "destroyed". To accomplish this, the method may employ classification methods including, but not limited to, Bayesian techniques and/or networks, nearest-neighbors methods, k-means, support vector machines, hidden Markov models, decision tree methods such as random forests and/or extremely randomized trees, regression, neural networks, and variations of these methods.

For example, the method may employ a decision tree methodology as follows. A random forest model may be trained on historical damage profiles, which classifies whether a part was damaged or destroyed, given that has been labeled as "damaged or destroyed", based on prior probabilities calculated as above.

An example decision tree may be: if the probability of part A being damaged is >0.3, and the probability of part B being damaged is <0.2, then label part C as "damaged". As is common in decision tree methods, many such trees may comprise a decision tree model.

For each vehicle part labeled as "damaged", we calculate a number h_j which estimates the number of hours necessary to repair that part. This h_j can take a range of values as appropriate to the part being examined.

From a set of historical damage profiles, we calculate the number of labor hours it took to repair that part, and call it l_k. We the calculate estimated number of hours necessary to repair the automotive part via the following formula:

$$h_j = \Sigma w_k * lk$$

where the w_k are weight vectors, which are calculated by computer using, for example, linear regression or logistic regression as outlined above, or by other methods including, but not limited to Bayesian techniques and/or networks, nearest-neighbors methods, k-means, support vector machines, hidden Markov models, decision tree methods such as random forests and/or extremely randomized trees, regression, neural networks, and variants of these methods.

Figure 24:
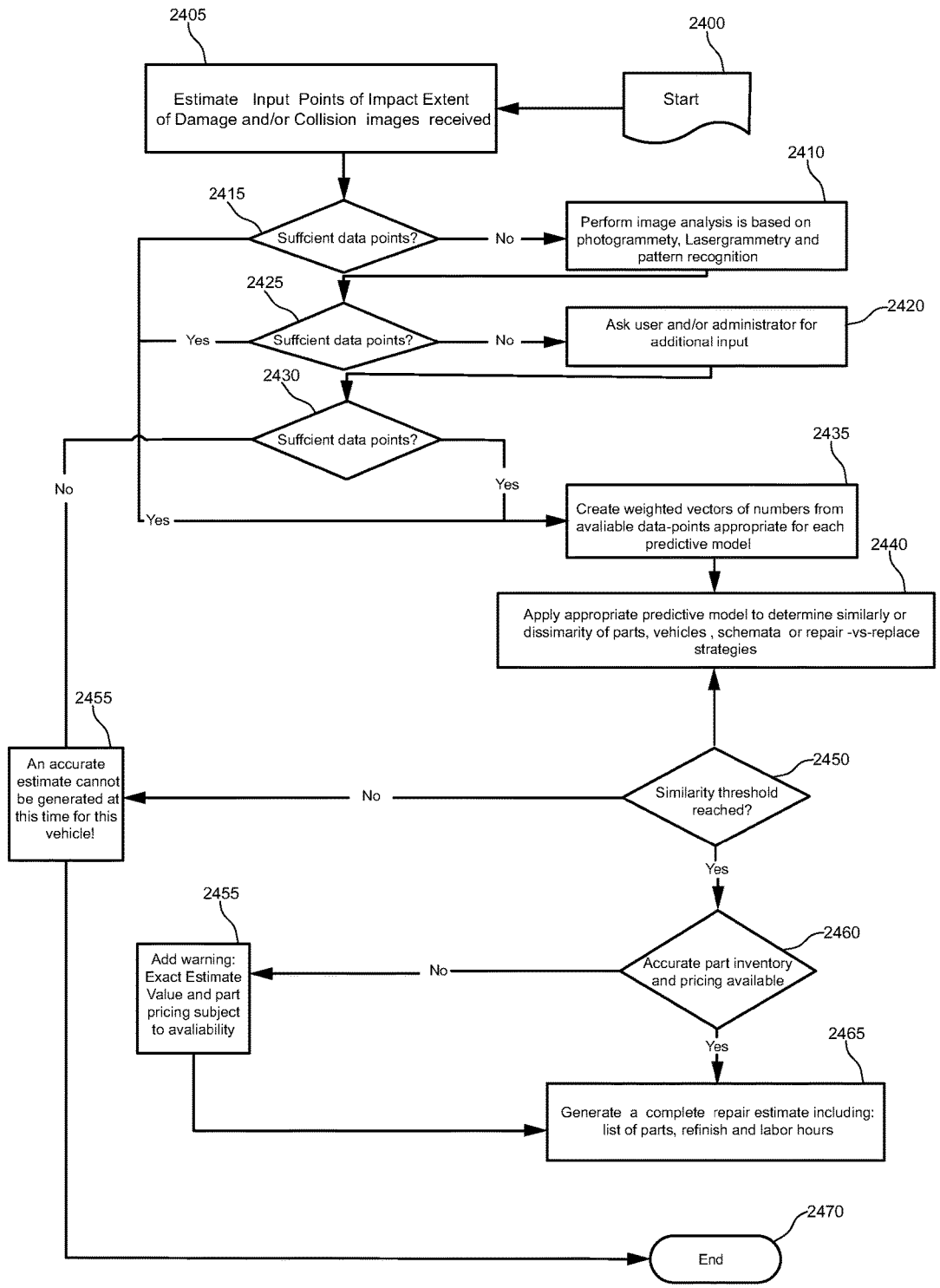
FIG. 24. Predictive Analytics Estimate Generation

From here, we have estimates for the amount of damage for each part, so we can proceed to 2460 as show in FIG. 24. An embodiment of the present invention's predictive entails:
1. Extract features (vectors)
2. Individual models output prior probabilities of each part being undamaged or not. Example: linear regression
3. These prior probabilities are aggregated (ensembled) to form a single prior probability for each part, as to whether it is undamaged or not. Example: logistic regression
4. A classifier is applied which labels not-undamaged parts as "damaged" or "destroyed". Example: decision tree
5. For those labeled "damaged", number of hours to repair are estimated based on historical cases. Example: linear regression, logistic regression
6. We then have a prediction for each part as to its status: undamaged, damaged, destroyed. For those that are damaged, we have an estimate of the number of hours necessary to repair it, based on historical cases.

This embodiment of the present invention is designed so that it is not tied to any one predictive or descriptive analytics method. The implementation of this embodiment of the present invention has some of the following and other advantages:
1. If one of the models fail, as it is sometimes the case, it is easy to turn that one off and preserve the predictive models that are working correctly. The present embodiment of present invention readily tolerates failure of an individual model.
2. The framework allows for cutting-edge ensemble approaches. What this means is that this approach covers "stacking" of models, which is a way of layering models so that the weighting of models is dynamic. So for example, k-means may work best on Ford sedans 1990-1994 and random forest might work better on Ford sedans 1995-1998. This framework covers that approach. This is currently the state of the art in predictive modeling, and the dominant approach used by winning Kaggle competitors.
3. Classification is separate from regression. So the steps that assign labels and those that assign numbers are separate, which increases transparency and should provide for great performance. The classifiers are doing classification and the regressors are doing regressions; models usually work best that way.
4. This framework can be researched in parallel by a fairly large team that work simultaneously, enabling independent researchers to build various parts of this model while waiting for piece A, B or C to become operational.
5. It also enables development of a rudimentary, but functionally complete models quickly, then prioritize other pieces that need refinement.

One embodiment of the present invention, includes a method for creating an accurate collision repair estimate, said method comprising: Providing databases of detailed repair estimate data and images, a user interface and a querying feature; where said user interface further comprises a cost indicator, a vehicle description indicator, one or more point-of-impact indicators, a crash extent-of-damage indicator and comprising the following steps; first, the user inputs data into said indicators, using a pointing device or a finger to move the Extent-of-damage indicator to generate an accurate estimate by the system performing real-time predictive analytics on structured estimate data of vehicles with similar characteristics to produce an accurate estimate for the current vehicle that is under assessment. This is done by searching the existing estimate database for structured estimate data with similar characteristics to those that the user has provided above and then displaying the list of parts, refinish and labor operations for parts that are determined to be damaged based on the predictive analytics results of the present invention, providing a total cost which is the aggregate of labor, refinish and parts cost for the repair, where the total is based on the cost of structured estimate data for vehicles with similar characteristics that were analyzed in order to produce an estimate.

repair data is defined as either historical repair estimate data on existing and completed repair estimates or a database of simulated structured estimate data that includes such repair information in a form to be consumed by this embodiment of the present invention.

In another embodiment of the present invention, the user interface further comprises a VIN indicator where the user can provide the Vehicle Identification Number of the vehicle under assessment instead of entering the vehicle's year, make and model.

In another embodiment of the present invention the user interface further comprises an output picture indicator that displays various images of damaged vehicles in a sorted order of damage, providing the opportunity to view sample images of damages incurred in similar collisions to the collision under assessment, to aid the user in selecting the correct extent-of-damage level for the collision and point-of-impact under assessment.

In another embodiment of the present invention the extent-of-damage indicator is a slider interface, which the user may slide left or right in various directions to increase or decrease the extent-of-damage of the collision under consideration, where said slider interface simplifies the identification of the extent of the damage for the current vehicle and generation of an accurate repair estimate in real-time, which takes into consideration the level of damage shown in an extent-of-damage indicator where the user specifies said level of damage by moving the slider.

Another embodiment of the present invention enables to user to repeat the point-of-impact selection for any number of additional points of impact, allowing the present invention to create an estimate for all points-of-impact, in addition to the initial point-of-impact.

In another embodiment, the present invention utilizes an image recognition module to automatically compare and match a plurality of images associated with various damage levels from automobile crashes with the images of the collision under consideration in order to identify the extent-of-damage most closely resembling the vehicle under assessment. This embodiment can further utilize Photogrammetry techniques to identify the parts that are damaged in the current collision through comparison with the damages incurred in other collision in its existing database of repair estimates for collision damages. This allows this embodiment of the present invention to automatically identify the points-of-impact and select the correct extent-of-damage indicator.

In another embodiment of the present invention the existing estimate database includes a plurality of manually created repair estimates specifically for use in the present invention to systematically cover all extent-of-damage levels and store them in a database to be utilized by the present invention to efficiently create repair estimates for each collision under assessment, for the purpose of satisfying cases wherein there is insufficient historical repair estimate data to produce an accurate repair estimate by the present invention.

In another embodiment of the present invention, the system comprises an "artificial intelligence module", which inserts the cost of repair associated with new estimates, as well as all the characteristics of those estimates obtained by the present invention into the existing estimate database. Such database will over time become more accurate, since it will accumulate data points on all estimates to enhance its ability to produce more accurate results.

In another embodiment of the present invention, the labor-rate data from the estimates in the existing estimate database are normalized based on a standard-labor rate for all labor operations so that comparisons can be performed on an equal basis, ensuring that labor-rate variations between various repair facilities do not impact the present invention's ability to properly compare historical collision damages to that of the collision under assessment.

In another embodiment of the present invention the part-type data and part-prices from the estimates in the existing estimate database are normalized based on standard part-types and prices, typically of OEM parts so that comparisons can be made on an equal basis, ensuring that part-type and part-price variations do not impact the present invention's ability to properly compare values of historical collision damages to that of the collision under assessment.

In another embodiment of the present invention once the standardization of labor-rates, part-prices and part-types are performed and the correct extent-of-damage, parts-list and labor hours are produced; the present invention invokes the parts procurement feature to find the most optimal set of parts for the repair and presents the user with options to apply the desired labor-rates in order to calculate the total cost of the repair.

The present invention employs modeling techniques that are used to predict the optimal repair/replace strategies for one or several vehicle parts. These techniques may make use of some or all of the following: photographs, videos, audio recordings, a database of past collision information, data on component/parts availability, data provided by the application user, metadata provided by the application user, location data, geographic data, weather data, vehicle schemata, photogrammetry data (as defined in this document), lasergrammetry data (as defined in this document), vehicle history, as well as data derived from these sources and from other sources.

The predictive models operate on vectors of numbers, which are derived from the above data sources. A vector is either a number or a sequence of numbers, which may have a fixed or variable length. An example vector is the angle of view of a photo of an automobile. Another example is a vector which takes value 1 if a certain vehicle part was damaged in a certain past collision, 2 if a certain vehicle part was destroyed in a certain past collision, and 0 otherwise.

These vectors are combined using techniques to form: 1. Measures of similarity; and 2. Measures of dissimilarity these measures are to be used between: Two or more photos of vehicles; Two or more photos of vehicle components/parts; Two or more videos of vehicles; Two or more videos of vehicle components/parts; Two or more text descriptions of vehicles; Two or more text descriptions of vehicle's components/parts; Two or vehicle schemata; Two or more vehicles; Two or more vehicle components/parts; A vehicle and a vehicle schemata; A vehicle component/part and a vehicle schemata or a part schemeata; Two or more repair/replace strategies.

The present invention uses mathematical operations on some or all of these vector outputs to calculate some or all of the following; The probability of damage to one or more vehicle components/parts; The degree of damage to one or more vehicle components/parts; The probability of damage to one or more vehicles; The degree of damage to one or more vehicles; A quantitative description of the damage to a vehicle; A verbal description of the damage to a vehicle; A quantitative description of the damage to a vehicle's component/parts; A verbal description of the damage to a vehicle's component/parts; One or more repair/replace strategies; The costs associated with repair/replace strategies; and An estimate of the accuracy of each of these outputs.

Another important aspect of the predictive analytics module of the present invention evaluates each of the parts that are damaged in the database of existing repair estimates and images in order to assign vectors of numbers that determine why a particular part was damaged in those accidents. These vectors are then utilized by the present invention to effectively evaluate similarities between vectors created for the collision under assessment in order to produce a list of damaged parts or repair versus replace strategies based on those similarities or dissimilarities. One embodiment of the present invention, calculates these vectors by evaluating the extent of damage incurred to each part for a given point-of-impact and severity of impact by evaluating the totals of various labor hours assigned to repairing each part in prior repair estimates. In other words, if for a left-front point-of-impact with severity 3, the left fender was repaired in 30% of the cases, and the labor hours for the repair were an average of 4 hours, the present invention predictive models produce the same hours of damage to repair the fender that was damaged in the vehicle under assessment. These results are influenced by a myriad of parameters in the predictive model that produce the most accurate outcome for a given repair estimate.

Another factor that plays a role on whether to include a 4 hour repair operation for a given part is the labor rate that determines the overall cost of that repair operation. For example, a labor hour of $30 an hour may result in the current invention opting to repair the part for $120, versus purchasing the part and replacing it for a total cost of $200. However, if the predefined labor rate for that repair is set to $60 an hour, a repair operation for the given part will be cost prohibitive as the cost of repair will be $240 per hour, versus the cost of the part and its replacement.

Furthermore, these methods may be used to calculate a ranking of any of the above outputs. A ranking is an assignment of a positive integer to an output, such that lower numbers correspond to better values of a cost function. A cost function is a mapping from a set of vectors to a set of numbers.

For example, a method may be used to rank several repair/replace strategies according to their estimated cost. In another example, a method may be used to rank the damage profile of several vehicles by similarity to another vehicle's damage profile.

Rankings can be performed using one or more ranking algorithms, including, but not limited to: instance ranking algorithms, label ranking algorithms, subset ranking algorithms, rank aggregation algorithms, bipartite/k-partite ranking algorithms, and learning-to-rank algorithms.

In another embodiment of the present invention, the querying feature utilizes Bayesian modeling to accurately determine the parts necessary for a given repair when querying the existing estimate database and producing its results.

Another embodiment of the present invention further comprises the additional steps that, within the user interface, the user is presented with one or more questions that are relevant to the vehicle under assessment, and the querying feature utilizes the answers to further refine the result-set by applying the answers to those specific questions to its produced parts-list, labor entries and estimate cost.

Another embodiment of the present invention further comprises that the user interface contains the following cost indicators; Body repair labor cost, Refinish labor cost, Structural labor cost, Frame labor cost and Mechanical labor costs; wherein the user can adjust the number of labor hours necessary to complete a repair and the added information is factored into the overall estimate cost in response to these adjustments, presenting an indication of whether the total adjustments are above or below the totals suggested by the present invention.

Another embodiment of the present invention, further comprises that when the querying feature displays the cost indicator it also displays a projected parts-list, including a plurality of individual repair parts associated with similar vehicles for repairs with the same point-of-impact and the same extent-of-damage, as the vehicle under consideration, and also that the user interface contains a damaged versus not damaged indicator to enable the user to add or remove individual parts as necessary in order to make adjustments to the total estimate cost the cost indicator.

Another embodiment of the present invention further comprises a projected parts-list, including a plurality of individual repair parts associated with similar vehicles for repairs with the same point-of-impact and the same extent-of-damage, as the vehicle under consideration, and also further comprising that the user interface includes a repair vs. replace indicator which the user can use to tell the present invention whether she plans to repair or replace individual parts as necessary in order to make adjustments to overwrite the suggestions of the present invention.

In another embodiment of the present invention, the querying feature further queries a VIN-to-part-number correlation database in order to validate the part numbers being selected for the repair, against a VIN database to ensure accuracy of those part numbers to improve the part selection process.

Another embodiment of the present invention comprises a parts procurement module, which ensures that the most cost-effective set of parts are procured for the repair.

Another embodiment of the present invention includes a repair shop database and an insurance carrier guidelines database wherein the present invention takes into consideration the guidelines defined in such databases that outline and dictate various requirements of each repair, such as repair vs. replace ratio, ratio of various part-types, allowable parts, etc., and the present invention queries the repair shop database and insurance carrier guidelines database to adhere to the provided guidelines in procurement of the necessary parts to perform the repair under consideration.

Another embodiment of the present invention utilizes vehicle's Telematics data and On-board Diagnostic data in order to further refine its results based on data obtained from these sources.

In another embodiment of the present invention the real-time availability of various parts and their prices from the procurement module is taken into consideration by the present invention to decide on the repair-versus-replace operation depending on the cost-effectiveness, availability and pricing of these parts and the currently selected labor rates; the present invention therefore automatically calculates a total cost of repair based on labor hours and labor rates for a given part based on a predetermined ratio of repair costs compared to the cost of procuring and replacing the given part, ensuring that the most cost-effective procedures are selected.

In another embodiment of the present invention the user provides a granular extent-of-damage level by clicking and dragging down the slider button in which case a granular extent-of-damage slider appears on the screen; this slider comprises lower and upper limits of 0 and 100 respectively, allowing expansion of the scale of extent-of-damage levels between two integers to the entire screen with $\frac{1}{100}$ increments; enabling the user to move the granular slider button to any desired value in which case, the projected parts-list is updated in real-time based on the extent-of-damage indicator value and the granular extent-of-damage indicator.

In another embodiment of the present invention alternatives to applicable parts in the projected parts-list are presented to user in the form of an alternative parts icon, clicking on which opens an alternative parts-list window allowing the user to change the current part to an alternative part, changing the existing estimate parts-list and associated costs automatically to reflect newly selected part alternate part.

Another embodiment of the present invention comprises a layering mechanism to assign layer numbers to each part as metadata wherein the number 1 corresponds to the outermost layer outer shell/paint of the vehicle and the number 1000 corresponds to the innermost layer of the vehicle and the generation of the projected parts-list is performed by taking into consideration such part layer information in order to more accurately ascertain the parts that are damaged by evaluating the layer to which each part belongs.

Another embodiment of the present invention takes into account a plurality of datasets and performs a combination of analyses on vehicle identification numbers, points of impact, extent-of-damage indicator, granular extent-of-damage slider, images of the accident for manual review, image recognition module for automatic review, answer to various deterministic questions to ascertain the type and extent-of-damage, carrier guidelines, shop guidelines, availability of alternative parts, normalization of labor rates, total-loss value of the vehicle in order to produce the most accurate estimate for the given repair.

Another embodiment of the present invention comprises a querying feature that evaluates its output and labor and parts-lists in real-time against the criteria from various databases as defined in the Cloud-Based Predictive Analytics Engine to produce alerts, warnings and reminders when certain criteria are not met or have exceeded their thresholds; enabling the user to take corrective action.

In another embodiment of the present invention the present invention uses a point-of-impact to Unique Part ID Correlation Database to more effectively identify the set of parts that are associated with each point-of-impact.

In another embodiment of the present invention comprises that, within the projected parts-list, there is displayed a button on each part line-item, and when the user clicks on said button, it pops-up a visual depiction of the pertinent section of the manufacturer's electronic parts catalog or EPC and a visual depiction of all the parts that are included in a given section for the specified vehicle, and such interface will highlight the parts that are currently added to the projected parts-list with a different color from those that are available but not included in the projected parts-list, allowing the user to add or remove parts by viewing the visual diagram or pictures of each part.

Another embodiment of the present invention further comprises a button or a link on each section of the vehicle, that displays an integrated manufacturer recommended repair procedures MRRP to further guide the user as to how the repair procedure must be performed and a description of the methods and the extent of effort necessary for the each procedure; Additionally comprising that the number of times these repair procedures are accessed with relation to the specific vehicle under assessment will be recorded in the existing estimate database along with the other data concerning the repair.

Another embodiment of the present invention is a system for quickly and effectively creating an accurate collision repair estimate based on a plurality of available historical repair or existing structured estimate data comprising a display screen from a group comprising an input device such as a PC, laptop, handheld, or smart phone, on which is displayed a user interface which contains a set of indicators, and a labor and parts estimate cost display, a means for data connection between the display screen and the non-volatile memory; said user interface, further comprising a cost indicator, a vehicle description indicator where the user inputs the year, make, and model and other necessary characteristics of the vehicle, a point-of-impact indicator, an extent-of-damage indicator, and a querying feature where the user inputs data into indicators, whereas the querying feature searches the existing estimate database for existing collision with similar characteristics to those that the user has entered into indicators, and the querying feature returns and displays a projected parts-list, necessary paint and labor operations and the total cost of repair in the cost indicator including an estimate of the total cost of the repair.

In another embodiment of the present invention the existing estimate database includes a plurality of systematically created repair estimates specifically for use in the current system, stored in the existing estimate database utilized by the current system to efficiently create a repair estimate without the need to individually create, scrutinize and manipulate each line item.

Another embodiment of the present invention comprises an "artificial intelligence module" stored on the volatile memory or non-volatile memory which inserts the actual cost of new estimates into the existing estimate database, so that over time, the existing estimate database becomes more accurate, because it keeps accumulating additional examples of repair estimates.

In another embodiment of the present invention the extent-of-damage indicator is a slider interface to be used with a pointing device or a finger, which the user may slide to increase or decrease the extent-of-damage of the collision under consideration, where said slider interface simplifies the identification of the extent-of-damage of the damage for the current vehicle and generation of a reliable repair estimate in real-time based on the extent-of-damage indicator.

In another embodiment of the present invention the system utilizes an image recognition module stored on one or more of a group comprising the non-volatile memory or volatile memory to automatically compare and match a plurality of images associated with various damage levels experienced by a vehicle involved in a crash, with pictures of the images of the collision under consideration in order to automatically determine the extent-of-damage experienced by the vehicle under consideration.

In another embodiment of the present invention the system comprises a parts procurement module stored on a non-volatile memory or volatile memory, where said parts procurement module ensures that the most cost-effective set of parts are being procured for the repair.

In another embodiment of the present invention the system, in addition to an extent-of-damage indicator 420 and the user is provided a plurality of images stored in the non-volatile memory or volatile memory representing various damage levels which the user may select that represent the level of damage of the vehicle being assessed for repair.

In another embodiment of the present invention the system takes into account real-time availability of various parts and their prices from the procurement module to decide on the repair-versus-replace operation depending on the cost effectiveness and real-time availability and pricing of these parts.

The method of the present invention is set to run on a computing device. A computing device on which the present invention can run would be comprised of a CPU, Hard Disk Drive, Keyboard, Monitor, CPU Main Memory and a portion of main memory where the system resides and executes. Any general-purpose computer with an appropriate amount of storage space is suitable for this purpose. Computer Devices like this are well known in the art and are not pertinent to the invention. The method of the present invention can also be written in a number of different software languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for generating a collision repair estimate through predictive analytics, executable by a machine and rendered on the display of the machine, comprising the steps of:
providing an application that is installed on a computing device for execution;
providing repair estimate software executable on a hardware platform;
providing a database of repair estimates consisting of data and images;
analyzing a plurality of prior accidents, their specified parts and associated images of those collisions to assign a layer number and one or more values in a form of vectors that are utilized by a predictive model to determine which parts are damaged and to what extent in order to perform comparison and estimate generation;
applying a predictive model to accurately determine the details of parts, refinish, and labor necessary for a given repair;
returning the results;
creating an estimate that contains the details of all parts, and refinish and labor hours necessary to repair the current vehicle;
selecting the crash level via an extent-of-damage level slider, wherein as the slider moves, various images of vehicles most closely resembling the current extent-of-damage appear on the screen; and
generating a parts-list, refinish and labor hour details and the total cost of repair in real-time as the slider moves and images are selected.

2. The method of claim 1, further comprising the step of:
grading the extent-of-damage of each estimate and part associated with a collision repair and associated images of damaged vehicles to specify an extent-of-damage for a given collision.

3. The method of claim 1, further utilizing a plurality of predictive modeling such as: Bayesian, methods, nearest neighbors methods, k-means, support vector machines, decision-tree methods to determine the parts, labor, and repair-vs-replace operations necessary for a given repair and part when calculating and returning results.

4. The method of claim 1, wherein the method relies on a plurality of created repair estimates specifically for use in the present invention to efficiently create a repair estimate.

5. The method of claim 1, wherein a point-of-impact and/or an extent-of-damage and parts-list, refinish and labor selection is performed automatically based on the results produced by a photogrammetry module, Lasergrammetry and pattern recognition modules.

6. The method of claim 1, further comprising the step of:
displaying a damaged indicator and a repair vs. replace indicator which the user can use to indicate whether or not individual parts are damaged and direct the repair or replacement of such parts as necessary in order to make adjustments to overwrite the predictive suggestion.

7. The method of claim 1, wherein
a local data entry and display system can reside at any location with an Internet-connection and an Internet-ready device and is responsible for:
receiving inputs from the user via the user interfaces and databases;
communicating the results to the Local Data Entry and Display System;
displaying the results on the user interface in real-time.

8. The method of claim 1, further comprising the steps of:
registering a user;
selecting the vehicle year, make, and model or entering the Vehicle Identification Number (VIN) of the vehicle involved in the collision;
selecting one or more points-of-impact in the collision; and
determining, by the cloud-based predictive analytics engine, a comprehensive parts-list, refinish and labor hours and cost pertaining to the specific vehicle and the selected point-of-impact of the vehicle involved in the accident.

9. The method of claim 1, further comprising the steps of:
Selecting a granular damage level via a granular extent-of-damage level slider.

10. The method of claim 1, further comprising the steps of:
providing a layering mechanism assigning layer numbers to each part as metadata where the number 1 corresponds to the outermost layer shell of the vehicle and the number 1000 corresponds to the innermost layer of the vehicle and a projected parts list, and refinish and labor hours are generated based on vectors derived from layer numbers associated with each part.

11. The method of claim 1, wherein
the generation of the parts-list, refinish and labor hours is aided by use of Vehicle Templates which can provide data on vehicle specific parts and components.

12. The method of claim 1, wherein Event Data Recorders (EDRs), data is collected in real-time in order to perform a more detailed and accurate analysis of the accident to produce a detailed parts-list, refinish, labor hours and total cost of repair of the vehicle.

13. The method of claim 1, wherein
the inputs to the present invention are further refined by at least one of the steps of:
adding parts of potentially missing parts to the Parts-list;
providing Electronic Parts Catalog parts selector for visual parts addition and removals;
labor hours adjustment for Body, Refinish, Structural, Frame and Mechanical;
selection of alternative similar parts through vaults;
application of Manufacturer Recommended Repair Procedures;
application or removal of suggested guidelines in Guideline Review interface;
once one, some or all of the above inputs are provided by the user in the user interface, the following outputs are generated:
a complete parts-list, refinish and labor operations;
Part Numbers, or Stock Keeping Unit (SKU) for every part on the list;
Total number of estimates; total cost of the estimate and breakdown of the cost;
Aftermarket and recycled vaults, as well as vaults for other part-types; and
Cost-Effectiveness-Factor (CEF) of individual parts and the estimate as a whole.

14. The method of claim 1, further comprising the steps of
creating a vector from available data-points for each predictive model;
applying one or more predictive models to determine the similarity or dissimilarity of parts, vehicles, components, schemata, repair-vs-replace strategies; and
generating a complete repair estimate including: list of parts, refinish, labor hours, and overall cost of repair taking into consideration accurate part inventory, pricing, and availability of parts.

15. The method of claim 1, further comprising the steps of
applying one or more predictive models;
generating an output of a prior probability status of undamaged, destroyed, or damaged for a given part;
making an effective decision as to whether or not a given parts is damaged; and
taking the course of action necessary to repair or replace that part in the repair estimate.

16. The method in claim 15, wherein
each predictive model can further calculate the number of labor hours necessary to repair the damaged parts, based on similarities or dissimilarities of one or more vectors calculated from data of prior repair estimates and prior probabilities created for a similar vehicle with one or more of the same points-of-impact and a similar extent-of-damage.

17. The method in claim 15, wherein
the predictive models indicate whether a part should be replaced or repaired based on the outcome of similarities or dissimilarities of one or more vectors calculated from data of prior repair estimates and prior probabilities created when evaluating the extent of damage to that part from a similar vehicle with a similar point-of-impact and a similar extent of damage.

18. The method in claim 15, wherein
the predictive models take into account an availability, pricing, and labor rate of the given repair in order to make a recommendation to repair versus replace a given part.

19. The method in claim 1, further comprising the steps of
taking into account not only the likelihood of a part being damaged, in and of itself; and
taking into account the likelihood of other related parts having been damaged in similar accidents for a similar vehicle with a similar extent of damage during the decision making process to indicate whether or not a part is damaged.

20. The method in claim 1, wherein:
machine learning and artificial intelligence capabilities incorporate previous prior analyses from the predictive model; and
as a result of processing a plurality of prior analyses in order to make more accurate decisions as the predictive model performs more analysis and retains the outcome of those analyses and probabilities.

* * * * *